United States Patent [19]

Gabrielli et al.

[11] Patent Number: 4,521,882
[45] Date of Patent: Jun. 4, 1985

[54] INTERFACE FOR ACCESSING A WIDE-BAND BUS HANDLING SPEECH AND DATA TRAFFIC

[75] Inventors: Luciano Gabrielli, Leini; Maurizio Sposini, Turin, both of Italy

[73] Assignee: Cselt Centro Studi E Laboratori Telecomunicazioni S.p.A., Turin, Italy

[21] Appl. No.: 476,224

[22] Filed: Mar. 17, 1983

[30] Foreign Application Priority Data

Mar. 17, 1982 [IT] Italy .............................. 67340 A/82

[51] Int. Cl.³ .............................................. H04J 3/02
[52] U.S. Cl. ........................................ 370/85; 370/94
[58] Field of Search ....................... 370/85, 94, 86, 89; 340/825.5, 825.51

[56] References Cited

U.S. PATENT DOCUMENTS

| | | | |
|---|---|---|---|
| 3,646,274 | 2/1972 | Nadir et al. ........................... | 370/85 |
| 4,058,681 | 11/1977 | Imaizumi et al. ..................... | 370/85 |
| 4,292,623 | 9/1981 | Eswaran et al. ...................... | 370/85 |
| 4,387,425 | 7/1983 | El-Gohary ............................ | 370/85 |

OTHER PUBLICATIONS

"Coming of Age: A Long-Awaited Standard for Heterogeneous Nets", Harold C. Folts, *Data Communications*, Jan. 1981, pp. 63-73.
"Data Processing-Open Systems Interconnection-Basic Reference Model", Computer Networks, 1981, pp. 81-118, North-Holland Publishing Company.
"A Local Access Network for Packetized Digital Voice Communication", Don H. Johnson et al, 13.4.1-13.4.5.
"Software Error Checking Procedures for Data Communication Protocols", J. Wong et al, *Computer Design*, Feb. 1979, pp. 122-125.

*Primary Examiner*—Douglas W. Olms
*Attorney, Agent, or Firm*—Karl F. Ross; Herbert Dubno

[57] ABSTRACT

Each of several stations served by a common bus in a communication system of the packet-switching type has a layered structure interposed between a user terminal and a port giving access to the bus, this structure including an interface separating a transceiver at a bottom level of the structure from upper levels controlling the establishment, maintenance and termination of temporary signal paths for the transmission of data between stations. The interface is divided into a lower-tier portion, implemented by wired-logic circuitry, and a higher-tier portion, programmed to set up virtual point-to-point data links between its own station and other stations under the control of a microprocessor. The lower-tier portion dialogues with the transceiver and has transmitting and receiving sections with respective buffer memories for the temporary storage of outgoing message frames generated at the higher-tier portion and incoming message frames extracted from the bus and found to be addressed to the station involved. When an outgoing sequence consisting of one or more frames has been completely stored, or when the transmitting-side buffer memory is full, a logic unit in the transmitting section explores the probability of successful access to the bus with the aid of an algorithm based on a random numerical sequence different for several stations competing for access. When such access has been gained, the stored sequence is sent out. When an incoming sequence has been completely received, or when the receiving-side buffer memory is full, the contents of that memory are transferred to the higher-tier portion.

13 Claims, 23 Drawing Figures

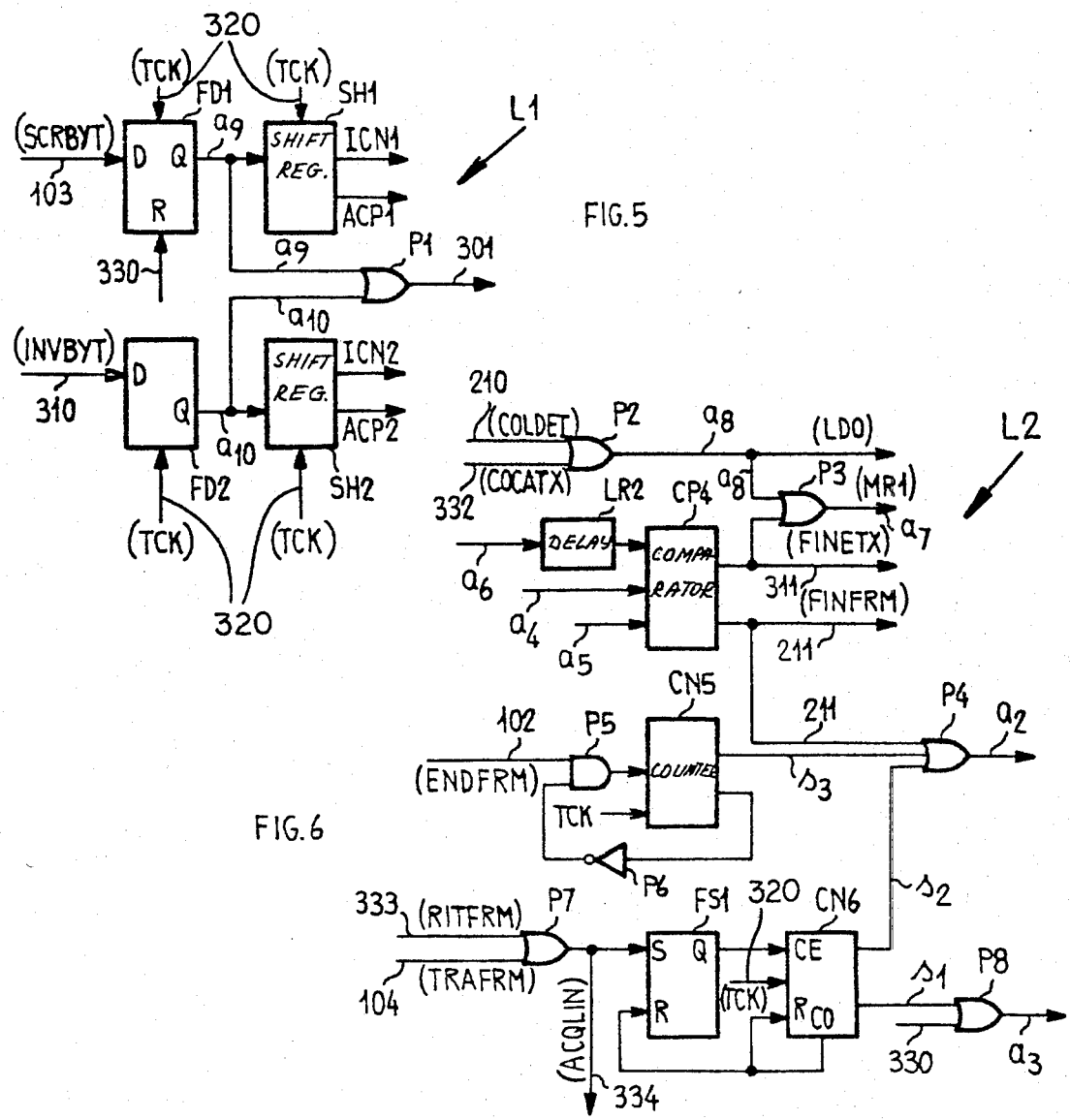
FIG.5
FIG.6
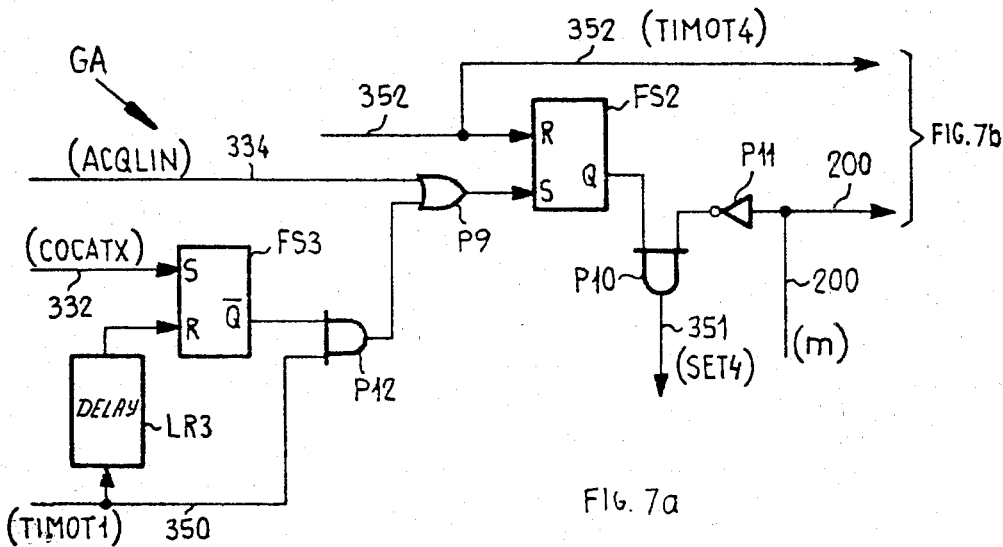
FIG.7a

INTERFACE FOR ACCESSING A WIDE-BAND BUS HANDLING SPEECH AND DATA TRAFFIC

FIELD OF THE INVENTION

Our present invention relates to a system for the digital transmission of information originating at various sources, e.g. telephone sets, data terminals and video or facsimile stations. More particularly, our invention has to do with an interface by which a terminal, at a given junction or node, may access a wide-band transmission channel—referred to hereinafter as a bus—to exchange data with any other such node by the known packet-switching technique.

BACKGROUND OF THE INVENTION

In any communication system using a bus common to a multiplicity of terminals or stations, the transmission and reception of messages is handled at each station in accordance with an established protocol. These protocols, as well as the means for their implementation, are the subject of international standards applicable to either point-to-point or hierarchically organized multipoint subsystems. A hierarchical multipoint subsystem assigns temporary roles of master and slave to associated stations.

One standardized procedure has become known as the Open Systems Interconnection (OSI) developed by the International Standards organization (ISO) as discussed in an article titled "Data Processing—Open Systems Interconnection—Basic Reference Model", published in the name of American National Standards Institute in *Computer Networks* 5 (1981), pages 81–118, by North-Holland Publishing Company. This model is based on the concept of a layered structure interposed between a user terminal and a communication medium or channel. Specifically, there are seven layers or levels each communicating with the adjoining layer or pair of layers of its own structure and with its peer in the corresponding structure of another station with which messages are being exchanged. The lower layers essentially conform to CCITT recommendation X.25. Further reference in this connection is made to an article by Harold C. Folts, titled "Coming of age: A long-awaited standard for heterogeneous nets", published in *Data Communications* of January 1981, pages 63–73.

Problems are encountered in adapting such a model to a system operating in the "broadcasting" mode in which a common channel accessible to a multiplicity of stations is designed to carry data packets pertaining to messsages exchanged between a given pair of stations intercommunicating in what may be termed a virtual point-to-point link. For the concurrent establishment of a certain number of such virtual links, the respective packets must be interleaved with rapid switchover between competing links. In the OSI model, the upper layers are implemented with the aid of microprocessors operating with a maximum clock frequency on the order of 10 MHz. With heavy traffic, as during peaks invariably occurring when a bus of bandwidth greater than 10 MHz is used for hybrid transmission (data, telephone, television and facsimile signals, for example), the processing time may become excessive.

OBJECTS OF THE INVENTION

The general object of our present invention, therefore, is to provide an interface enabling the use of microprocessor circuitry for the high-speed control of transmission and reception of messages at a station served by a wide-band bus in a communication system operating at least partly in the broadcast mode.

More particularly, our invention aims at expediting in such a station the access to the bus, the verification of correct transmission, the detection of messages addressed to that station and related tasks including, for example, avoidance of cluttering of buffer memories with message fragments incapable of being transmitted.

SUMMARY OF THE INVENTION

An interface embodying our invention, forming part of a layered structure as discussed above, comprises a first or lower-tier portion with wired-logic circuitry and a second or higher-tier portion with microprogrammed circuitry. The first portion temporarily stores outgoing information to be sent over the bus as well as incoming information received from the bus and addressed to the station involved, this information being in the form of digital message frames. The second portion, under the control of a microprocessor, organizes the establishment of virtual point-to-point links between the station referred to and other stations accessible through that bus.

In a layered structure conforming to the OSI model, this interface may be regarded as a subdivision of the second-lowest level which in that model is termed the Data-Link Layer, overlying the lowermost level or Physical Layer and underlying the third level defined as Network Layer. A sublevel remaining between the Network Layer and the upper-tier portion of our interface still carries out certain functions of the standard second layer, specifically data-link-connection activation and deactivation referred to hereinafter as DLC. The layout and operation of the two portions of our interface are independent of the remainder of the structure as well as of the nature of the bus which could be an optical fiber, a coaxial cable or a radio link, for example. Furthermore, while this interface is primarily intended to facilitate broadcast-type communication, it could also be used in systems with actual point-to-point or hierarchic multipoint connections.

Pursuant to a more particular feature of our invention, the first interface portion or component is divided into a transmitting section and a receiving section with respective buffer memories for the storage of outgoing and incoming message frames. Upon complete storage of an outgoing sequence of one or more frames, generated at the second interface portion or component, a logic unit in that section implements an access algorithm to explore the probability that the bus is available for a transmission of the outgoing sequence to the station for which it is intended; this procedure will also be initiated if, before such a sequence has been entirely stored, the corresponding buffer memory is fully loaded. When an attempt to gain access is successful, i.e. when the bus is actually found idle, the contents of that memory are read out. If the attempt fails, i.e. if collision is detected in the form of carrier energy on the bus within a certain test period, the readout is blocked; provision may be made for renewing the attempt a number of times up to a certain maximum. Incoming sequences, when completely stored in the buffer memory of the receiving section, are transferred to the second component; such transfer will also take place when the receiving-side memory is fully loaded. The exhaustion of the storage capacity of either memory can be detected by comparators connected to the outputs of counters for the writing and reading addresses; when the address of the next memory cell to be loaded matches that of the last cell previously read, the memory is full.

The first or lower-tier interface portion may also be provided with an error-control stage advantageously operating with a cyclic redundancy code (CRC) inserted into outgoing frames and extracted from incoming frames. A commercially available wired-logic unit for this purpose is described in an article titled "Software Error Checking Procedures For Data Communication Protocols" by J. Wong, W. Kolofa and J. Krause, published in *Computer Design* of February 1979, pages 122-125.

BRIEF DESCRIPTION OF THE DRAWING

The above and other features of our invention will now be described in detail with reference to the accompanying drawing in which:

FIGS. 5 and 6 show specific circuitry for two logic networks forming part of the control unit of FIG. 4;

FIGS. 7a, 7b and 7c show details of a logic unit included in the transmitting section of the component of FIG. 3;

SPECIFIC DESCRIPTION

Figure 1:
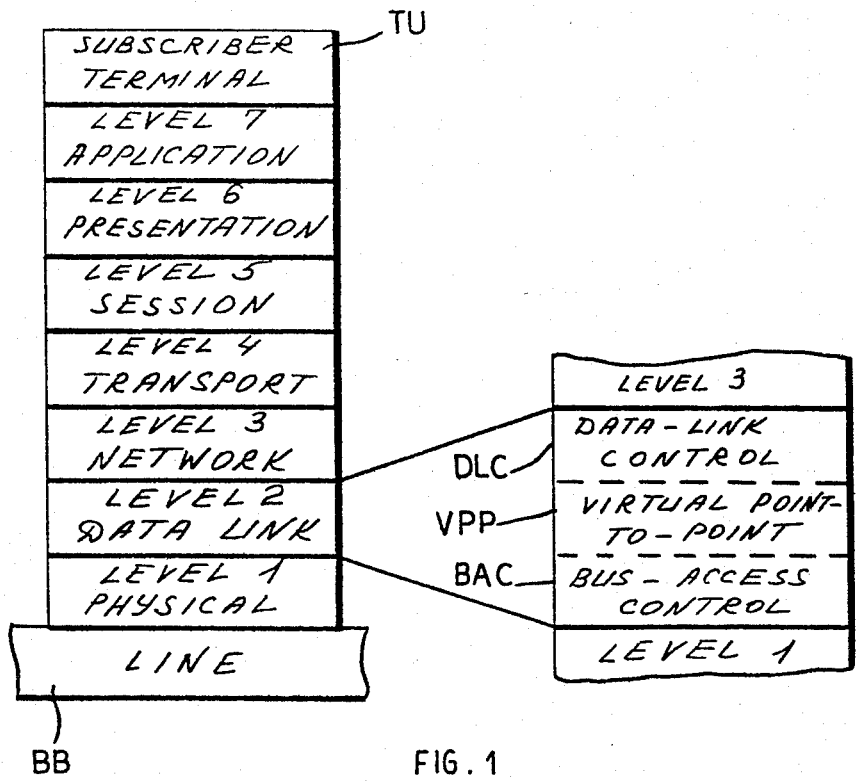
FIG. 1 schematically illustrates a modification of the known OSI protocol in accordance with our present invention.

In FIG. 1 we have shown, at left, the layered structure of the OSI protocol referred to above, comprising seven levels interposed between a line or bus BB and a subscriber terminal TU. This structure, as more fully described in the aforementioned articles, comprises a lowermost level 1 termed a Physical Layer, an adjoining level 2 termed a Data-Link Layer, a further level 3 termed a Network Layer, and upper levels 4, 5, 6 and 7 respectively termed Transport, Session, Presentation and Application Layers. Level 1 encompasses the mechanical and electrical operations involved in making and breaking a connection between line BB and the station comprising terminal TU. Level 2 controls the use of the facilities of level 1 to provide temporary links with other stations via line BB and also serves for the detection as well as possible correction of errors within level 1. Level 3 implements addressing, sequencing and blocking procedures for the establishment, maintenance and termination of data links with the aid of signals exchanged between intercommunicating stations. Level 4 determines optimum routing of messages, possibly via additional transmission paths in tandem with line BB. Level 5 serves for synchronizing the operations of the intercommunicating stations and managing the data exchange therebetween. Level 6 performs format, code and other conversions required for the data exchange. Level 7, finally, acts as an interface between the subscriber terminal TU and the underlying level 6. Further details will be found in the publications referred to.

The functions to be carried out at level 2 more particularly include the following:

(i) Initialization, i.e. the start-up of data transmission from an idle state;

(ii) framing, i.e. indicating the beginning and the end of a message block by characteristic bit groups;

(iii) link management, i.e. control of message transmission and reception as well as supervision of data-transfer sequences;

(iv) error control, i.e. acknowledgment of correctly received messages, detection of defects in transmission and requests for retransmission of defective messages;

(v) sequence control, i.e. numbering of messages to eliminate duplications, identification of lost messages and requests for retransmission in the event of such a loss;

(vi) flow control, i.e. regulation of message transfer over the transmission path;

(vii) transparency, i.e. incorporation of outgoing and incoming information into a pure data stream;

(viii) abnormality rectification, i.e. the taking of corrective measures upon detection of an inadmissible situation or in response to reception of procedure-modifying instructions based on the protocol.

In accordance with our present invention, and as indicated in the right-hand half of FIG. 1, we have divided level 2 into three sublevels respectively designated DLC, VPP and BAC. The uppermost sublevel DLC performs most of the functions of standard level 2 pertaining to the establishment, maintenance and termination of data-link connections. The intermediate sublevel VPP implements, in a programmed manner, the functions of establishing, maintaining and terminating virtual point-to-point connections or data links. The lowermost sublevel BAC serves for bus-access control, namely the timing of data transfer between line BB and the facilities of level 1 with proper regard for the activities of other terminals sharing the same transmission path. The operations at level 1 controlled by sublevel BAC include the generation and the checking of codes for the recognition of possible transmission errors, such as the aforementioned cyclic redundancy code (CRC), as well as bit stuffing or bit suppression where necessary for synchronization purposes. These latter functions, therefore, are now divorced from those of the standard data-link layer transferred to sublevel DLC.

Figure 2:
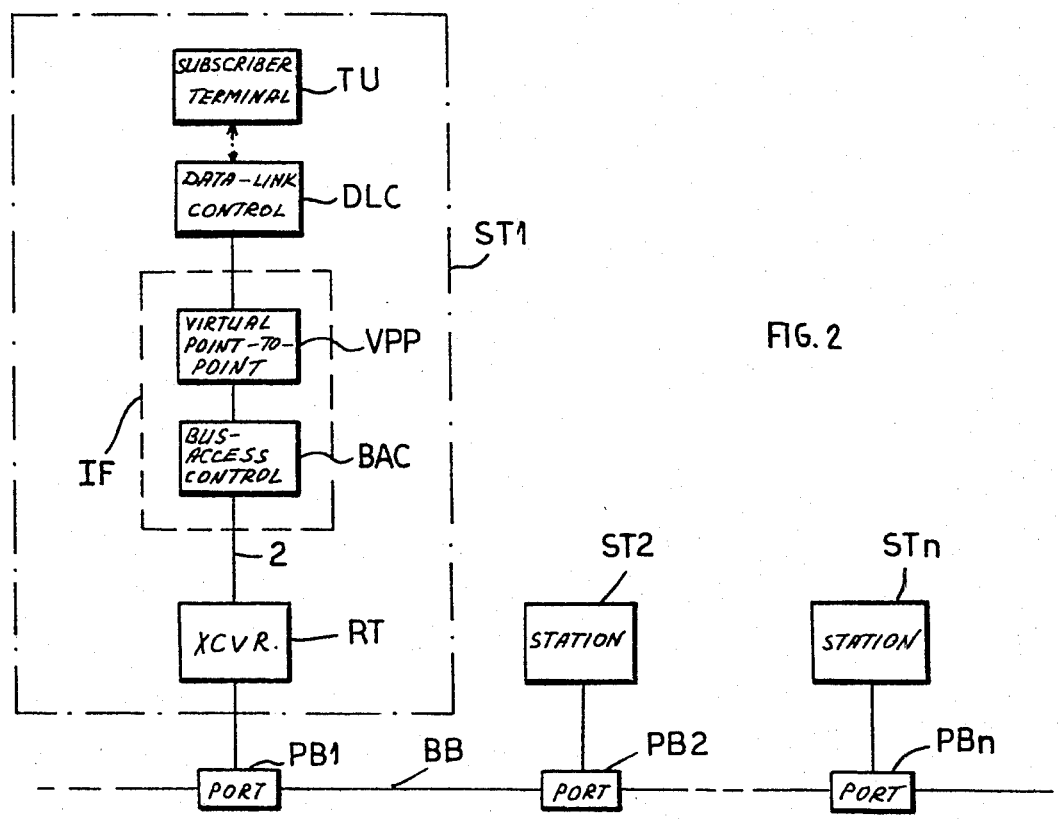
FIG. 2 is a more detailed diagram showing part of a communication system to which our invention is applicable.

In FIG. 2 we have shown a group of stations, ST1, ST2, ... STn, all served by the same bus BB which they can access via respective ports PB1, PB2, ... PBn. Each of these stations, as particularly illustrated for station ST1, includes a subscriber terminal TU at the top of a hierarchical structure similar to that of FIG. 1, with levels 3-7 omitted for the sake of simplicity. Sublevels BAC and VPP are shown as a lower-tier portion and a higher-tier portion of an interface IF inserted between sublevel DLC and a transceiver RT which, in effect, constitutes the Physical Layer of level 1 and communicates directly with access port PB1. Interface portion BAC dialogues with component VPP by a connection 1 and with transceiver RT by a connection 2. These connections are wire multiples as more fully described below with reference to FIGS. 3–13. The nature of transceiver RT and the structure of ports PB1–PBn depend, of course, on the character of bus BB and are entirely conventional.

The tasks assigned to interface portion BAC include the handling of the access algorithm associated with port PB1, temporary storage of outgoing and incoming frames, adaptation of terminal speed to line speed, and decoding of the address of port PB1 in accordance with the established mode of operation such as broadcast, hierarchical multipoint or actual point-to-point transmission. We shall assume hereinafter that the system operates in the broadcast mode. If a cyclic redundancy code (CRC) is used to enable verification of correct transmission of a message frame, the computation of that code for an outgoing frame and its checking on an incoming frame are also carried out by portion BAC. A frame may encompass a single packet or several packets with different ultimate destinations.

Interface component VPP is programmed to control the operations involved in setting up and releasing virtual point-to-point connections or links in the broadcast mode. With the aid of suitable buffer stores at level 3, interface component VPP may concurrently handle several virtual links extending between station ST1 and respective other stations reached via bus BB. These links will have to be handled independently of one another by component VPP as concerns their initialization, termination and possible reinitialization. An advantageous procedure for releasing an existing link may require a first request to that effect from component VPP of the initiating station which can be accepted or rejected by its peer at the responding station. After rejecting the request, the latter station may send out a second request which can then be accepted or rejected by originating component VPP, and so on until the two intercommunicating components agree on the release. The constituents of component VPP, including its microprocessor, may be shared by sublevel DLC.

Component VPP, whose operation of course is closely correlated with that of component BAC, coacts with sublevel DLC in the framing of an outgoing message. Generally, the information words or bytes included in a frame will be preceded by a header specifying the address of the receiving station for which the message is intended, an indication of frame length in terms of the number of bytes included therein, an identification of the originating station, an identification number allotted to the virtual link set up between the two stations, and a control field. A closing flag may comprise checking bits for error detection, as by the aforementioned CRC routine. The part of the header relating to the virtual link is inserted under the control of component VPP; the actual message content, of course, comes from the higher levels. The entire frame may be preceded by a preamble generated by receiver RT and used for synchronization (frequency locking, voltage-level matching etc.).

Several frames, especially short ones, may be successively sent out in a single data sequence after access to the bus has been obtained. Stations competing for such access may avail themselves of a contention protocol of the type known as CSMA-CD (for carrier-sense multiple-access collision detection) with persistent probability. Such a protocol has been described, albeit only for speech-signal transmission, in a paper titled "A Local Access Network for Packetized Digital Voice Communication" by Don H. Johnson and Gerald C. O'Leary, presented at the 1979 IEEE National Telecommunication Conference held Nov. 27-28 1979 in Washington, D.C. Certain modifications of that protocol are used for adapting it to our present invention, as will be described hereinafter.

Figure 3:
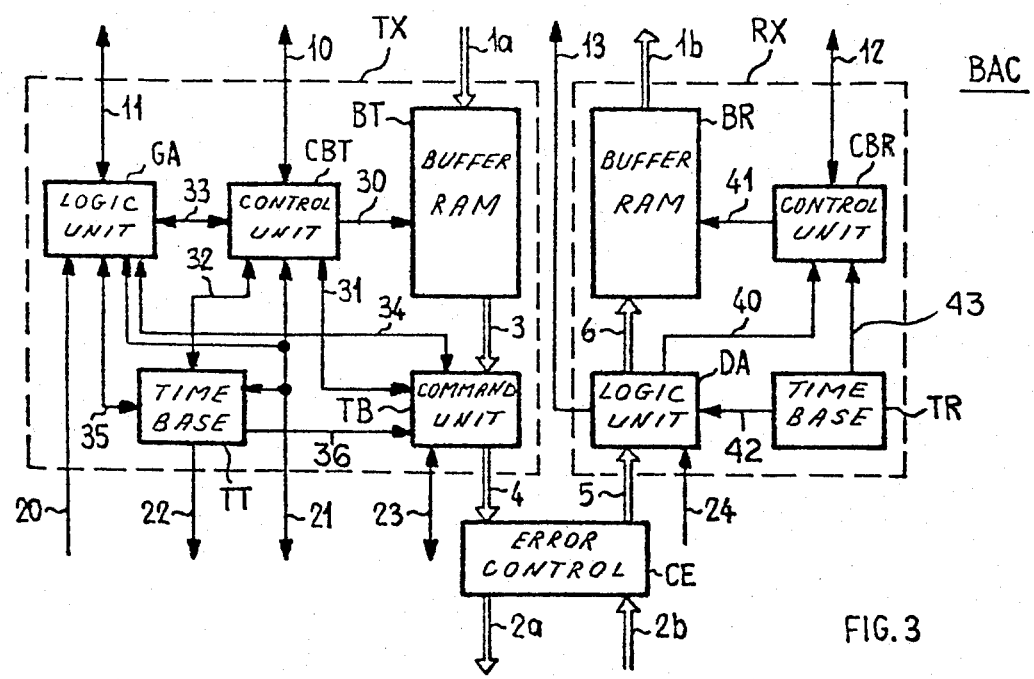
FIG. 3 is a block diagram of a lower-tier portion of an interface according to our invention.

In FIG. 3 we have shown component BAC divided into a transmitting section TX and a receiving section RX. In this Figure, as well as in subsequent ones, one-line arrows are used to denote signal lines whereas double-line arrows represent data lines, any such line consisting of one or more wire leads. All connections whose reference numerals have 1 as their first digit constitute part of the multiple 1 shown in FIG. 2; similarly, connections whose reference numerals have 2 as their first digit form part of the multiple 2. Thus, a submultiple 1a extends from component VPP (FIG. 2) to a buffer memory BT of the random-access or read-/write type in transmitting section TX while a similar memory BR in receiving section RX works into component VPP via a multiple 1b. Section TX further includes a control unit CBT associated with memory BT, a logic unit GA, a command unit TB and a time base TT. Section RX includes a control unit CBR, associated with memory BR, as well as a logic unit DA and a time base TR. Also forming part of component BAC is an error-control stage CE preferably operating according to the CRC routine and dialoguing with the transceiver RT of FIG. 2 by way of an outgoing multiple 2a and an incoming multiple 2b. Transmission-side memory BT is read via a multiple 3 extending to command unit TB from which a further multiple 4 leads to control unit CE. Conversely, a multiple 5 extends from unit CE to unit DA for the writing of words into memory BR by way of multiple 6.

Units CBT and GA communicate with component VPP via respective signal lines 10 and 11 while a similar line 12 connects that component with unit CBR. An incoming line 20 extends from transceiver RT to unit GA while a two-way line 21 connects that transceiver with unit CBT. Time base TT controls the transceiver via a line 22 and unit TB is connected to that transceiver via a two-way line 23. A further line 24 passes from the transceiver to unit DA.

The blocks of transmitting section TX are interconnected by various intra-unit lines 30–36 while similar lines 40–43 interconnect the blocks of receiving section RX. In FIGS. 4–9, individual leads of signal lines shown in FIG. 3 will be designated by the same numerals followed by a further digit.

The two controllers CBT and CBR of FIG. 3 are designed to establish priorities for the handling of outgoing and incoming message frames, respectively. Thus, in order to insure optimum utilization of the associated bus BB, unit CBT inhibits the storage of further outgoing frames in memory BT when the station concerned, i.e. the one labeled ST1 in FIG. 2, has gained access to the bus for a readout of a data sequence contained in that memory. Conversely, unit CBR stops the readout of the contents of memory BR as soon as unit DA recognizes an incoming data sequence as addressed to this station. Taking into account the limited storage capacity of the two buffer memories, each control unit must also prevent further writing when the associated memory is full, in order to avoid loss of information.

The purpose of logic unit GA is to implement the access algorithm already referred to and to exchange relevant information with other constituents of transmitting section TX.

Unit TB is a logic network which, under the control of unit GA and transceiver RT, extracts the data stored in memory BT, serializes them and transmits them bit by bit to unit CE for further forwarding to the transceiver.

Time bases TT and TR supply the clock signals necessary for the operations of the other circuit elements of sections TX and TR, respectively. They generate respective pulse trains TCK and RCK, indicated in subsequent Figures, at a fundamental clock frequency equal to the bit rate on bus BB or, possibly, to a submultiple of that rate. Unit TT, more particularly, comprises a number of counters stepped by the fundamental clock pulses to establish certain time intervals T0, T1, T2 and T4 of different durations. Interval T0 equals twice the maximum propagation time of a signal on the bus and thus measures the time for a round trip as needed to determine the absence of conflicting activity on the bus. Interval T1 is a delay suitably chosen for possible rescheduling of unsuccessful access attempts. Inteval T2 is a guard time between successive frames in a data sequence emitted by any given station. Interval T4, exceeding T2, determines the minimum time of lack of detected activity needed to consider the bus idle. Time base TR establishes waiting periods determining whether an incoming sequence has been fully received so that readout of memory BR can begin.

Figure 4:
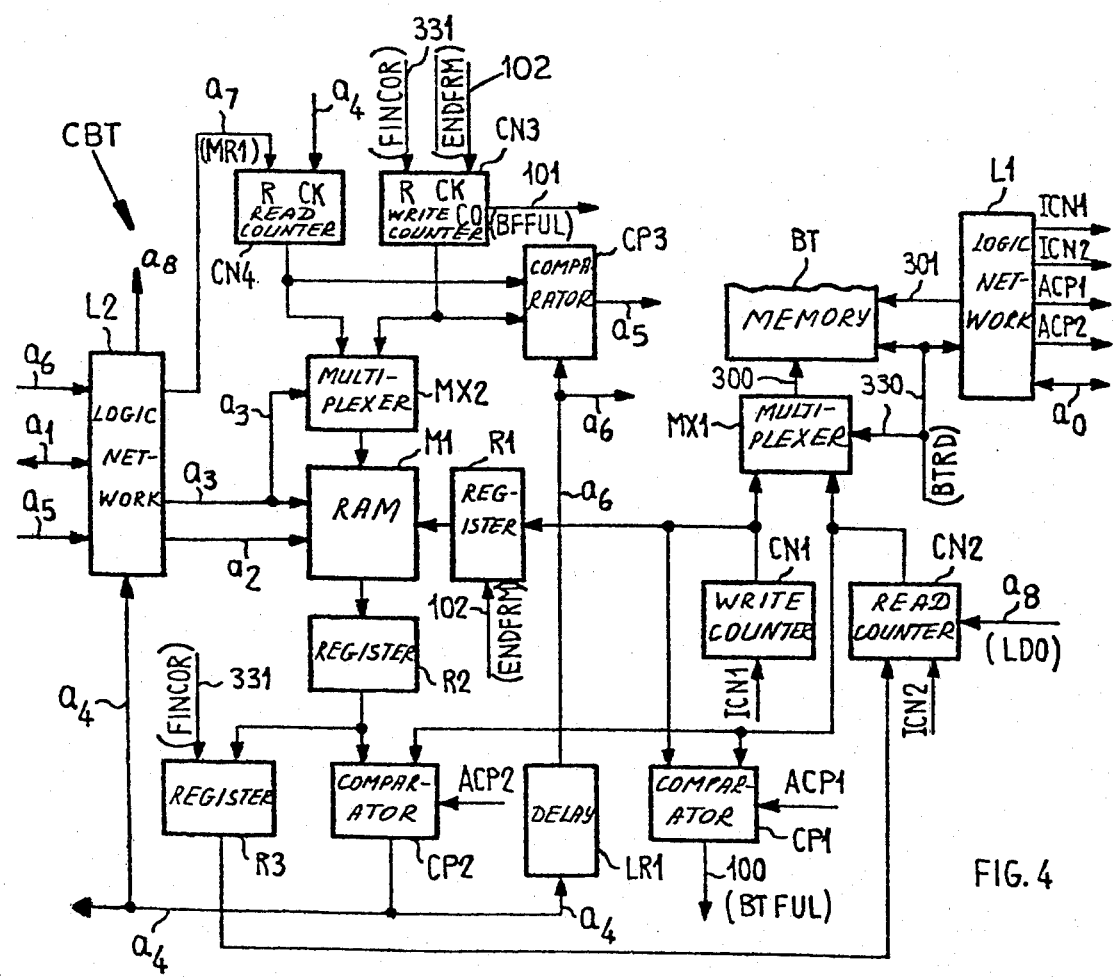
FIG. 4 is a more detailed diagram of a control unit included in a transmitting section of the interface portion of FIG. 3.

An illustrated in FIG. 4, which shows details of controller CBT, this unit addresses the memory BT through a line 300 via a multiplexer MX1 having two inputs respectively connected to a writing-address counter CN1 and a reading-address counter CN2. These counters are stepped by respective pulses ICN1 and ICN2 emitted by logic network L1 which supplies read/write- enabling signals to memory BT via a lead 301. Multiplexer MX1 is switched from writing to reading, under the control of logic unit GA, by a signal BTRD also delivered via a lead 330 to memory BT and network L1. Normally, i.e. in the absence of signal BTRD, the memory is set for writing and receives corresponding cell addresses by way of multiplexer MX1 from counter CN1.

Network L1, illustrated in greater detail in FIG. 5 discussed hereinafter, also emits activating signals ACP1 and ACP2 to a pair of comparators CP1 and CP2. Other connections linking that network with circuits outside controller CBT are represented by a double-headed arrow $a_0$ in FIG. 4.

Comparator CP1 has inputs respectively connected to the outputs of counters CN1 and CN2 in order to inform component VPP (FIG. 2), via a signal BTFUL emitted on a lead 100, that memory BT has been loaded to capacity as evidenced by the equality of the reading and writing addresses generated by the two counters. The writing-address counter CN1 also works into a register R1 which, in response to an end-of-frame signal ENDFRM on a lead 102 emanating from component VPP, stores the address then generated by that counter which could be either that of the last word of a preceding frame or that of the first word of a subsequent frame. As this information only serves to draw a line between consecutive frames, for orderly normal readout and to prevent loss of information under circumstances described hereinafter, it is immaterial which of these two boundary-word addresses is entered in register R1; in the specific embodiment described we shall assume that the registered address is the first one of a subsequent frame, i.e. that signal ENDFRM arrives after counter CN1 has been advanced.

A random-access memory M1 is able to receive reading instructions from a logic network L2 over a lead $a_2$ but is normally set for writing. Its cells are addressable, for loading with the contents of its input register R1, via a multiplexer MX2 by two other writing-address and reading-address counters CN3 and CN4 shown provided with stepping inputs CK and resetting inputs R; their counting capacity corresponds to the storage capacity of memory M1. A switching signal on an output lead $a_3$ of logic network L2, designed to connect memory M1 to the output of counter CN4 instead to counter CN3, also acts as a reading command for the memory. Counter CN3 is stepped by the trailing edge of signal ENDFRM, i.e. by the leading edge of its negation $\overline{ENDFRM}$ on lead 102, and is reset by a signal FINCOR on an output lead 331 of logic unit GA (FIG. 3) confirming the correct transfer of a frame from memory BT to transceiver RT (FIG. 2). Counter CN4 is stepped by a pulse on an output lead $a_4$ of comparator CP2, which also has a branch extending to logic network L2, and is resettable by a signal MR1 emitted by that network on a lead $a_7$. Counter CN3 has a carry-out port CO on which a signal BFFUL appears when memory M1 is fully loaded as determined by the capacity of this counter; signal BFFUL is delivered on a lead 101 to component VPP where it has the same effect as signal BTFUL on lead 100 as described hereinafter. The separate generation of signals BTFUL and BFFUL is necessary since memory M1, storing the addresses of only one byte per frame, and memory BT, storing all the bytes, will generally not fill up at the same time. As there is no lower limit for the length of a frame, a succession of relatively short frames may give rise to signal BFFUL well before the capacity of memory BT is exhausted.

An output register R2 associated with memory M1 works into one input of comparator CP2 as well as into a register R3 in parallel therewith. The other input of comparator CP2 is tied to the output of counter CN2 in parallel with one of the inputs of comparator CP1. A branch of lead $a_4$ emanating from comparator CP2 is connected through a delay circuit LR1 to an extension $a_6$ which leads to an activating input of a comparator CP3 with data inputs respectively connected to the outputs of counters CN3 and CN4 whereby this comparator detects, in a manner analogous to that described for comparator CP1, the completed readout of memory M1. An output lead $a_5$ of comparator CP3 as well as a branch of lead $a_6$ extends to logic network L2. Register R3 is enabled by signal FINCOR on lead 331 to receive the contents of register R2 and has an output connected to a loading input of counter CN2 for resetting same to the address last stored in memory M1 in response to a blocking signal LDO on an output lead $a_8$ of network L2; signal LDO indicates a detected collision, as a result of which an attempt to access the bus has been aborted, or a congestion in section TX detected by unit GA.

As shown in FIG. 5, logic network L1 comprises two D-type flip-flops FD1 and FD2 with data inputs D, set outputs Q and clock inputs receiving pulses TCK from time base TT by way of a lead 320. Flip-flop FD1 also has a resetting input tied to the lead 330 which carries the aforedescribed read signal BTRD. The data input of this flip-flop is tied to a lead 103 originating at component VPP (FIG. 2) and carrying a writing instruction SCRBYT signifying that a word or byte to be stored in memory BT is ready on multiple 1a (FIG. 3). An enabling pulse then appears on an output lead $a_9$ of flip-flop FD1 which feeds it to memory BT (FIGS. 3 and 4) by way of an OR gate P1 and the lead 301. The same writing pulse is also entered in a shift register SH1 likewise stepped by clock pulses TCK; this register acts as a delay device generating a stepping pulse ICN1 for counter CN1 and an activating pulse ACP1 for comparator CP1 with respective time lags insuring that the counter is advanced only after the byte has been fully written in memory BT and that the comparator operates only after such advance. The data input of flip-flop FD2 is tied to a lead 310 for receiving from command unit TB (FIG. 3) a reading instruction INVBYT when a byte is to be extracted from memory BT. An enabling pulse is then generated on an output lead $a_{10}$ of this flip-flop which reaches the lead 301 via OR gate P1 and is also entered in a shift register SH2 likewise stepped by clock pulses TCK. Register SH2 emits, with the necessary delays, the stepping pulse ICN2 for counter CN2 and the activating pulse ACP2 for comparator CP2. The enabling pulse on lead $a_9$ is, of course, terminated by the appearance of read signal BTRD on lead 330 even if instruction SCRBYT is still present or has reappeared on lead 103.

Logic network L2, as shown in FIG. 6, comprises an OR gate P2 with inputs connected to respective leads 210 and 332 which carry inhibiting signals COLDET and COCATX under conditions to be described. Signal COLDET reports the detection of a collision and originates at the transceiver RT of FIG. 2 when bus BB is found active after a decision to access it has been made. Signal COCATX originates at logic unit GA and indicates congestion, i.e. an exhaustion of the storage capacity of memory BT. OR gate P2 energizes the lead $a_8$ carrying the blocking signal LDO already referred to. A branch of lead $a_8$ also extends to an input of an OR gate P3 whose other input is tied to a lead 311 extending to command unit TB from a output of a comparator CP4. This comparator has data inputs connected to leads $a_4$ and $a_5$, respectively emanating from comparators CP2 and CP3 in FIG. 4, and is activated by the delayed output signal of comparator CP2 present on lead $a_6$ and after further retardation of that signal by a delay circuit LR2. When the signals on leads $a_4$ and $a_5$ coincide after the activation of comparator CP3, i.e. when the storage capacity of memory M1 has been exhausted, comparator CP4 emits on a lead 311 an end-of-transmission signal FINETX; otherwise, that is when the advance of comparator CP2 at the end of a writing cycle does not load the last available cell of memory M1, an output lead 211 of comparator CP4 carries an end-of-frame signal FINFRM. Lead 311, aside from feeding the signal FINETX to the lead $a_7$ via OR gate P3, also supplies it to the command unit TB of FIG. 3. The signal FINFRM normally appearing on lead 211 upon every activation of comparator CP4 is delivered on the one hand to transceiver RT (FIG. 2) and on the other hand to one input of an OR gate P4 having two further inputs connected to a pair of internal leads $s_2$ and $s_3$ respectively originating at two other counters CN5 and CN6. Lead 102, carrying the original ENDFRM generated by component VPP to indicate the end of an outgoing frame sent in via multiple 1a (FIG. 3), terminates at one input of an AND gate P5 whose other input is connected to an output lead $s_4$ of counter CN5 via an inverter P6. Gate P5 is therefore normally conductive and passes the signal ENDFRM to activate the counter which is then stepped by clock TCK to energize first the lead $s_2$ and subsequently the lead $s_4$, thereby generating a reading instruction of predetermined duration on lead $a_2$ extending to memory M1 of FIG. 4. The energization of lead $s_4$ cuts off the AND gate P5 to terminate this instruction even if signal ENDFRM persists. The trailing edge of the latter signal resets the counter CN5 by way of an inverter P6'.

A flip-flop FS1 of the set/reset type has its setting input S connected to an output of an OR gate P7 which conducts in response to a transfer request TRAFRM on lead 104 from component VPP or to a repeat request RITFRM on a lead 333 from unit GA. Either of these transfer commands gives rise to a line-acquisition command ACQLIN on a lead 334 extending to unit GA. The set output Q of flip-flop FS1 is tied to an enabling input CE of counter CN6 which thereupon energizes its output lead $s_2$ and, after a certain number of clock pulses TCK, also generates the switching signal for memory M1 and multiplexer MX2 (FIG. 4) by energizing another lead $s_1$ connected through an OR gate P8 to lead $a_3$. Gate P8 has another input tied to the lead 330 which carries the read signal BTRD discussed with reference to FIG. 4. When counter CN6 emits a carry-out signal on its port CO, it resets itself concurrently with flip-flop FS1.

Figure 7B:
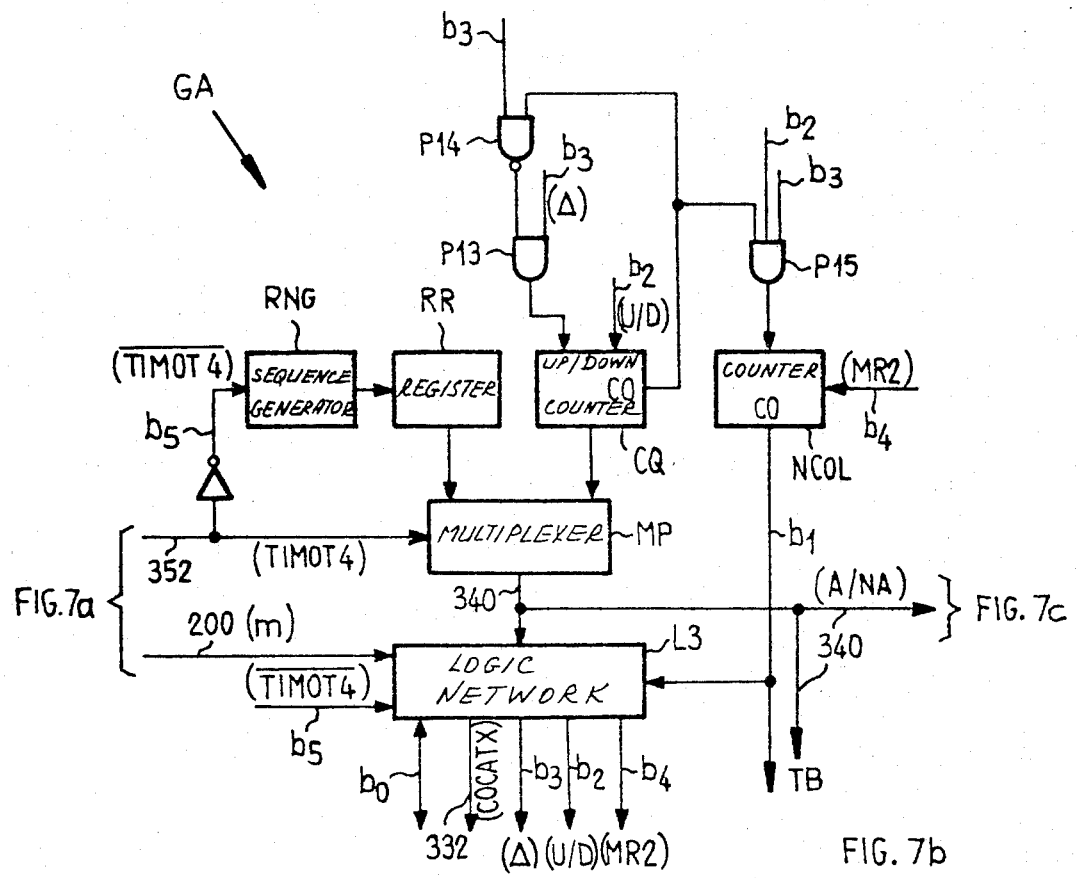
Figure 7C:
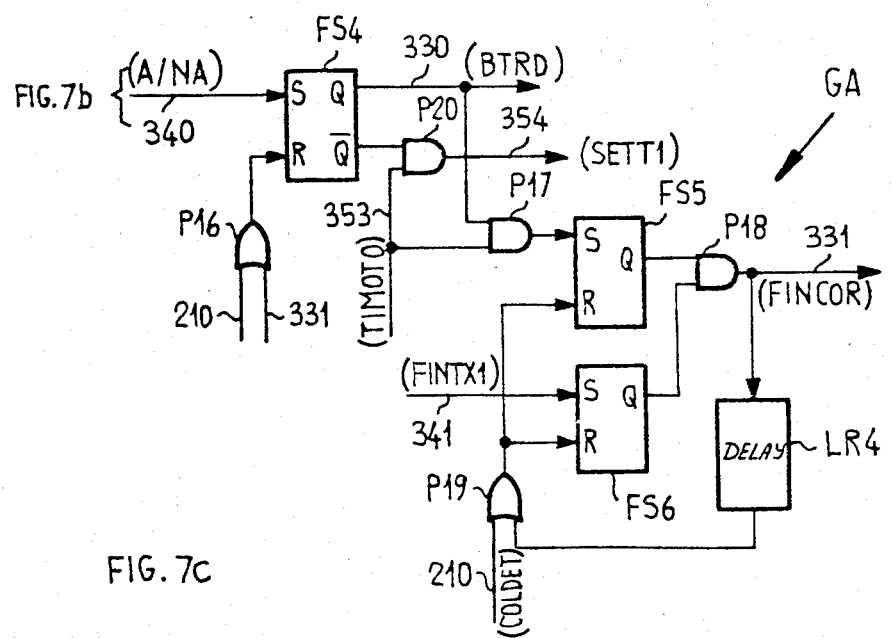

Logic unit GA, illustrated in FIGS. 7a–7c, comprises another set/reset flip-flop FS2 whose setting input S receives the line-acquisition command AQCLIN on lead 334 via an OR gate P9 as shown in FIG. 7a. The set output Q of flip-flop FS2 is tied to one input of an AND gate P10 whose other input is connected via an inverter P11 to a lead 200 emanating from transceiver RT (FIG. 2). When the activity sensor of the transceiver finds bus BB to be momentarily idle, a signal m on lead 200 is at logical "0" so that gate P10 conducts in the presence of signal AQCLIN and generates on a lead 351 a command SETT4 which sets the time base TT to measure the interval T4 in order to determine whether the absence of activity on the bus is due to a pause between two frames emitted by a station that has seized the bus or indicates the termination of such emission. A timing pulse TIMOT4, generated by time base TT at the end of that interval, appears on a lead 352 connected to the resetting input R of flip-flop FS2. OR gate P9 has a second input tied to the output of an AND gate P12 with inputs respectively connected to an output lead 350 of time base TT and to the reset output $\overline{Q}$ of a further set/reset flip-flop FS3 whose setting input S is connected to the lead 332 possibly carrying the congestion signal COCATX referred to in conjunction with FIG. 6. Lead 350 receives a similar timing signal TIMOT1 after an interval T1 following a setting command SETT1 sent to time base TT from unit GA on a lead 354 as shown in FIG. 7c and discussed below. With flip-flop FS3 reset in the absence of congestion signal COCATX, AND gate P12 conducts in response to signal TIMOT1 to set the flip-flop FS2 with the same effect as that of acquisition signal AQCLIN. Timing signal TIMOT1 is further fed to resetting input R of flip-flop FS3 via a delay circuit LR3 with a lag, which of course is less than the duration of signal TIMOT1, designed to allow for a possible intervention of the congestion signal COCATX as a result of a writing operation then in progress.

The part of unit GA depicted in FIG. 7b includes a generator RNG of a random sequence advanced by the trailing edge of signal TIMOT4, i.e. by the appearance of its inversion $\overline{\text{TIMOT4}}$ on a lead $b_5$ connected via an inverter P12' to lead 352. A branch of this latter lead terminates at an activating input of a multiplier MP respectively receiving two numerical values r and q from a register RR, connected to the output of sequence generator RNG, and from an up/down counter CQ with a data input tied to the output of an AND gate P13 and with a switching input receiving a signal U/D on a lead $b_2$ from the aforementioned logic network L3. Gate P13 has one input connected to another output lead $b_3$ of network L3 carrying a counting command Δ. A branch of lead $b_3$ also terminates at an input of gate P13 and has another input tied to the carry-out port CO of counter CQ. The latter port is further connected to an input of an AND gate P15 having two other inputs respectively tied to leads $b_2$ and $b_3$. The output of gate P15 is connected to a stepping input of a counter NCOL which limits the number of times the station may attempt to access the busy bus BB. Counter NCOL, resettable by a signal MR2 on an output lead $b_4$ of logic network L3, has its carry-out port CO connected to a lead $b_1$ which terminates at network L3 and has an extension 110 leading to component VPP.

Multiplier MP has an output lead 340 whose state of energization, represented by a binary decision signal A/NA, indicates whether or not an attempt should be made to access the bus. Signal A/NA is delivered to logic network L3 as well as to command unit TB. Other internal connections between network L3 and associated elements of unit GA, described hereinafter with reference to FIG. 8, are encompassed in a line $b_0$.

As shown in FIG. 7c, lead 340 supplies the decision signal A/NA to the setting input S of a further set/reset flip-flop FS4 whose resetting input R is connected by an OR gate P16 to leads 210 and 331 respectively conveying the signals COLDET and FINCOR. The set output Q of this flip-flop is tied to the lead 330 carrying the read signal BTRD; a branch of this lead is connected to an input of and AND gate P17 whose other input is tied to a lead 353 which receives a timing signal TIMOT0 from time base TT, after an interval T0 following the generation of signal TIMOT4. Conduction of gate P17 in the event of a positive decision (A/NA=1) sets a flip-flop FS5 whose set output Q is connected to one input of and AND gate P18 having another input tied to the set output of yet a further flip-flop FS6 of this type which is resettable by a transmission-terminating signal FINTX1; the latter signal is emitted by unit TB in the presence of signal FINETX or COLDET as described below in conjunction with FIG. 9. Gate P18, when conducting, generates the signal FINCOR on lead 331 and, via a delay circuit LR4, feeds it back to an input of an OR gate P19 for resetting both flip-flops FS5 and FS6. Such resetting also takes place in the presence of signal COLDET on lead 210 which is tied to a second input of gate P19. An AND gate P20, with inputs respectively tied to lead 353 and to the reset output $\overline{Q}$ of flip-flop FS4, generates on a lead 354 a command SETT1 inducing time base TT to measure an interval T1 in the event of a negative decision (A/NA=0) of multiplier MP. Upon the appearance of timing signal TOMOT1 on lead 350 (FIG. 7a) in response to that command, and in the absence of congestion signal COCATX, the renewed setting of flip-flop FS2 initiates a repetition of the decision-making procedure.

This procedure, in conformity with a modification of the access algorithm described in the above-identified paper of Johnson and O'Leary, involves the calculation of a probability p=1/q of a successful outcome of an access attempt; a comparison of this probability with a randomly variable threshold, namely the signal r emitted by register RR of FIG. 7b, will give rise to a positive decision A/NA32 1 if p>r. The reciprocal value q is read out from counter CQ and is fed, together with threshold r, to multiplier MP which determines whether the product q·r<1 to satisfy the condition for a positive decision; this can be achieved through a NOR gate with inputs connected to the stage outputs of the multiplier carrying the most significant digits of the product. Parameter g, which represents an estimate of the number of potentially active stations competing for access to the bus, is initially given the value 1 and is updated according to the following procedure: If the decision is negative but the bus has remained idle during the timing interval TO following the activation of multiplier MP, counter CQ is decremented by one step to reduce q by 1 (its magnitude, of course, can never go below 0). If, on a positive decision, the access attempt is successful, the value of q is left unchanged. If the attempt is unsuccessful, i.e. if collision occurs during interval TO, counter CQ is incremented by one step. A maximum value for q is imposed by the capacity of counter CQ; when its carry-out signal is emitted at port CO, NOR gate P14 blocks further transmission of counting commands Δ from network L3 and unblocks the AND gate P15 for a stepping of counter NCOL upon a coincidence of signals on leads $b_2$ and $b_3$. This prevents the generation of further repeat requests RITFRM on lead 333 (FIG. 6) as will become apparent. The random operation of sequence generator RNG virtually assures that, at a given instant, different thresholds r established for the competing stations.

Figure 8:
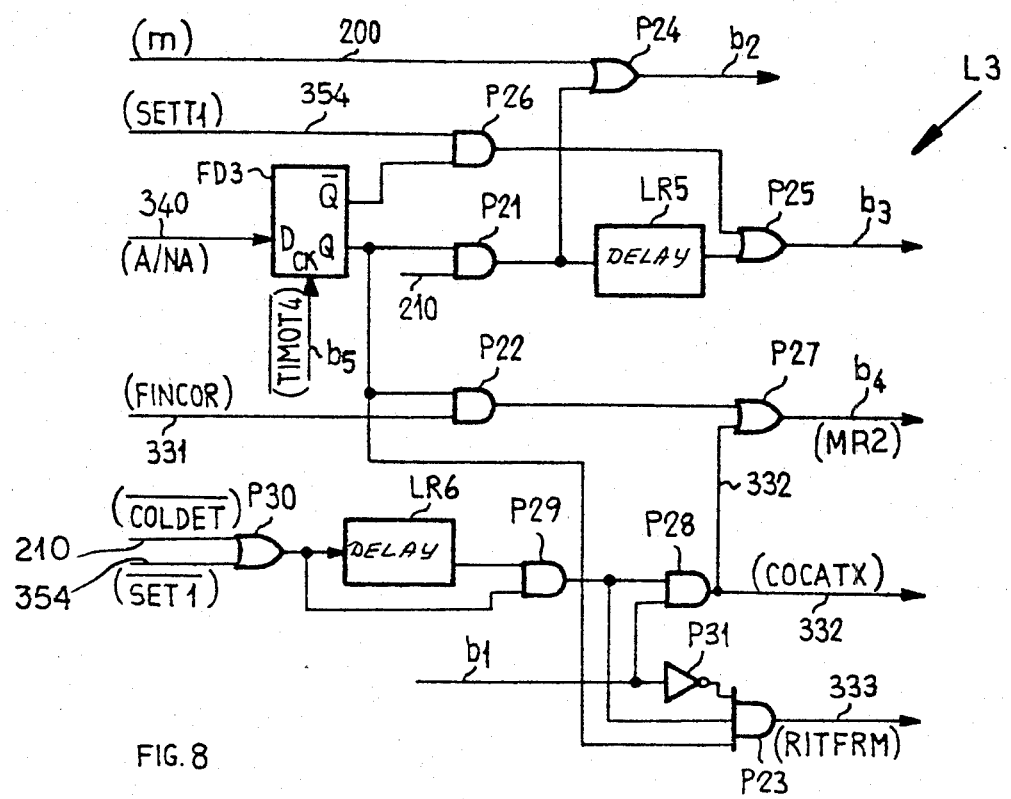
FIG. 8 depicts particulars of a logic network forming part of the unit shown in FIGS. 7a-7c.

Logic network L3, as shown in FIG. 8, comprises a flip-flop FD3 whose data input receives the decision signal A/NA on lead 340 and whose clock input is responsive to the inverted timing signal $\overline{\text{TIMOT4}}$ on lead $b_5$. The set output Q of this flip-flop is connected in parallel to respective inputs of three AND gates P21, P22 and P23, gates P21 and P22 having other inputs respectively connected to leads 210 and 331 carrying signals COLDET and FINCOR. Output lead $b_1$ of access-attempt counter NCOL (FIG. 7b) feeds the carry-out signal of that counter via an inverter P31 to a second input of gate P23 which has a third input tied to the output of AND gate P29. An OR gate P30 has inputs connected via nonillustrated inverters to leads 210 and 354 (FIG. 7c) for receiving signals COLDET and SETT1, its output being connected directly to one input and via a delay circuit LR6 to another input of gate P29. An OR gate P24 has inputs respectively connected to lead 200 and to the output of gate P21 to energize the lead $b_2$ in the presence of an activating signal m=1 or upon the occurrence of collision signal 210 in the set state of flip-flop FD3. The reset output $\overline{Q}$ of this flip-flop is tied to one input of an AND gate P26 whose other input receives the timing request SETT1 from lead 354. An OR gate P25 has one input connected to the output of gate P26 and has another input coupled via delay circuit LR5 to the output of gate P21; its output is tied to lead $b_3$. The outputs of gates P28 and P23 are respectively connected to leads 332 and 333 carrying the signals COCATX and RITFRM. Lead 332 also has a branch extending to one input of an OR gate 27 whose other input is tied to the output of gate P22; this OR gate, when conducting, generates the resetting signal MR2 for counter NCOL on lead b4.

As will be apparent, inverter P31 prevents the generation of signal RITFRM upon the energization of lead $b_1$, i.e. when counter NCOL has reached the limit of its capacity. A new access attempt would then require the emission of another request TRAFRM on lead 104 (FIG. 6) by component VPP which receives the carryout signal via lead 110.

Figure 9:
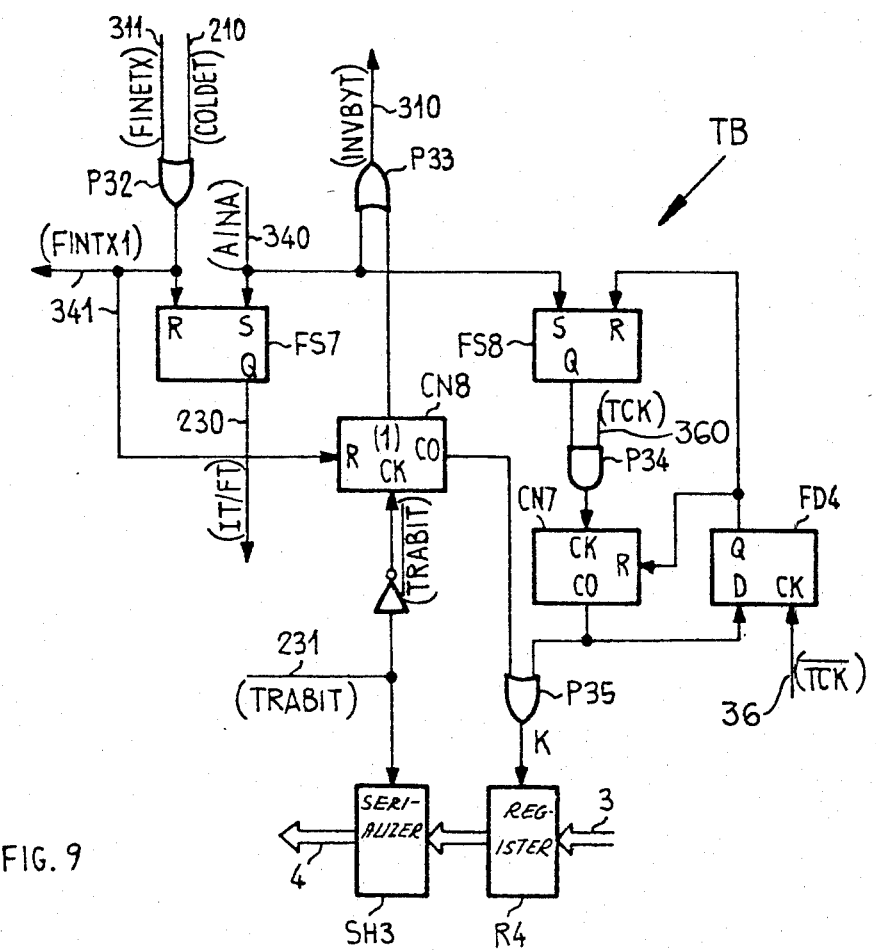
FIG. 9 shows details of a command unit included in the transmitting section of the component of FIG. 3.

As shown in FIG. 9, command unit TB comprises a flip-flop FS7 whose setting input receives the decision signal A/NA on lead 340 while its resetting input R is connected to the output of an OR gate P32 to which signals COLDET and FINETEX are respectively applied by way of leads 210 and 311. The presence of either of these signals gives rise to the signal FINTX1 on lead 341 which extends from the output of gate P32 and has a branch leading to the resetting input of a counter CN8 whose stepping input CK receives an inversion $\overline{TRABIT}$ of a bit-transfer request TRABIT, delivered by transceiver RT (FIG. 2) on a lead 231, via an inverter P32'. An output of counter CN8, energized on its first step from zero, terminates at one input of an OR gate P33 whose other input is tied to lead 340; upon conduction, gate P33 generates the byte-reading request INVBYT on the lead 310 feeding the data input of flip-flop FD2 in FIG. 5. Lead 340 further extends to a setting input S of a flip-flop FS8 whose set output Q is tied to one input of an AND gate P34 receiving clock pulses TCK on another input from a lead 360. Gate P34 works into the stepping input CK of a counter CN7 which has its resetting input R connected in parallel with that of flip-flop FS8 to the set output Q of a further flip-flop FD4. Input CK of flip-flop FD4 responds to the inverted clock pulses $\overline{TCK}$ on lead 360. The carry-out port CO of counter CN7 is connected to the data input D of flip-flop FD4 and in parallel therewith to one input of an OR gate P35 having another input tied to the corresponding port of counter CN8. When either of these counters reaches the limit of its capacity, gate P35 delivers a transfer command K to a register R4 which has received a data word from memory BT via its output multiple 3 upon the energization of lead 301 (FIGS. 4 and 5) by the signal INVBYT. Signal K causes the loading of this word, in parallel, into a serializer SH3 for tranmsission to error-control stage CE (FIG. 3) via data lead 4; this transmission is controlled by the signal TRABIT on lead 231 which is a sequence of pulses fed to a stepping input of the serializer. Counter CN7 serves to delay the generation of signal K beyond the emission of signal INVBYT upon energization of lead 340.

Thus, a decision making A/NA=1 will cause the readout of the first stored byte from memory BT to register R4 as flip-flop FS8 is set by the leading edge of that decision signal. The delay introduced by counter CN7 allows sufficient time for the storage of that byte in register R4 before the generation of signal K which coincides with the setting of flip-flop FD4 whereby flip-flop FS8 is reset. The setting of flip-flop FS7 by signal A/NA generates a signal IT/FT on a lead 230 extending to transceiver RT (FIG. 2), informing that transceiver that the readout has been initiated and is in progress. On generating the request signal TRABIT in response to that information, the transceiver determines the readout rate in accordance with its own clock which conforms to the bit rate on bus BB and may be different from the operating frequency of time base TT. Since, however, transceiver RT must preface the message bits proper with a preamble and possible frame-synchronizing bits, the first pulse of sequence TRABIT will be delayed; this accounts for the need to control the transfer of the first byte via circuitry FS8 and CN7. Thus, the first pulse of signal TRABIT will already find that byte available in register SH3. From then on, for the duration of the readout, signal INVBYT will be regenerated to extract a new byte from memory BT even as the preceding byte is still being discharged from serializer SH3 so that sufficient time is available for the somewhat slower process of reloading the register R4. Signal K is always generated immediately after the transmission of the last bit of the preceding byte on data line 4.

When transmission is terminated normally, by signal FINETEX on lead 311, or is aborted soon after its inception, by collision signal COLDET on lead 210, flip-flop FS7 and counter CN 8 are reset while the event is being reported to unit GA by signal FINTXI with resulting setting of flip-flop FS6 (FIG. 7c). If the termination is not the result of a collision, signal FINCOR is generated on lead 331 by the conduction of gate P18 with flip-flop FS5 in its set state.

We shall now describe in a comprehensive manner the operation of transmitting section TX during its writing and reading phase.

WRITING

With memories BT and M1 (FIG. 4) initially preset for writing, their address inputs are connected by the associated multiplexers MX1 and MX2 to the outputs of counters CN1 and CN3, respectively. Component VPP (FIG. 2), informed of this condition by suitable signals via line 10 (FIG. 3), can now emit a succession of bytes constituting one or more frames of an outgoing message. In response to the command SCRBYT, sent out with each byte, logic network L1 then energizes the enabling lead 301 of memory BT to condition the memory for each entry of that word into a cell addressed by counter CN1, stepped by signal ICN1, as described with reference to FIG. 5. Comparator CP1, when activated by signal ACP1, checks whether that address coincides with the one represented with the setting of the inactive counter CN2 which identifies the first memory cell going to be read. With counter CN2 initially at zero, comparator CP1 will not find a match between the addresses of counters CN1 and CN2 so that lead 100 will not be energized.

At the end of the first frame, component VPP emits the signal ENDFRM to load the register R1 with the address last generated by counter CN1. With the termination of signal ENDFRM, counter CN3 is stepped to address the first cell of memory M1 in which the address stored in register R1 is written in response to the energization of leads $s_3$ and $a_2$ shown in FIG. 6.

These operations are then repeated for subsequent frames, if any, until the last frame has been stored in memory BT unless writing is terminated earlier by the generation of signal BTFUL or BFFUL on lead 100 or 101, as described above. Either of the latter two signals stops component VPP from sending out further writing instructions SCRYBT and initiates a reading operation.

READING

With generation of instruction TRAFRM on lead 104 by component VPP, signal ACQLIN comes into existence along with a signal on lead a3 which switches the multiplexer MX2 and commands the loading of register R2 with the contents of the cell of memory M1 addressed by counter CN4, namely cell No. 1. in this instance. The data word so extracted from memory M1 is also introduced into register R3 while being made accessible to comparator CP2. When, with successive stepping of counter CN2, all the bytes of the first frame stored in memory BT have been read out, comparator CP2 notes the identity of the last address generated by counter CN2 with the one stored in register R2 and energizes its output lead a4 to advance the counter CN4. This insures the orderly readout of all the bytes of each frame in the event that access to bus BB has been obtained.

In order that the bus may be accessed, signal m on lead 200 (FIGS. 7a and 7b) must first go to zero whereupon signal ACQLIN starts the count of interval T4 to detect whether the idle state of the bus is of the proper duration indicative of termination of the emission of the last previous message by a competing station. If activity on bus BB resumes within interval T4, the disappearance of signal m is again awaited. If no such activity is sensed upon the occurrence of timing signal TIMOT4, multiplier MP (FIG. 7b) is activated to generate the positive decision signal A/NA=1 on lead 340 if parameter probability p is found to be less than the threshold r as discussed above. In the event of such positive decision, read signal BTRD is generated on lead 330 (FIG. 7c) to switch the memory BT from its writing condition to its reading condition. Unit TB (FIG. 9) conditions transceiver RT (FIG. 2) for accessing the bus via port PB1, FIG. 2, by generating the signal IT/FT. The readout of the stored bytes then progresses during interval T0, by way of register R4 and serializer SH3 as described above, pending confirmation or possible termination of the access. If no competing activity is sensed on bus BB until the end of interval T0, the transmission of the stored data sequence continues until memory BT is empty. If, however, collision occurs before the appearance of signal TIMOT0, transmission is aborted by the signal COLDET generated on lead 210 at the level of transceiver RT.

When the transmission of the outgoing sequence proceeds uninterrupted, comparator CP3 of FIG. 4 is activated by comparator CP2 after the readout of each frame to determine whether the entire message has been read, i.e. whether the addresses generated by counters CN3 and CN4 are identical. If this is not the case, i.e. if lead a5 remains de-energized, comparator CP4 of network L2 (FIG. 6) emits the signal FINFRM to start the measuring of guard interval T2 by time base TT. During this interval the reading action is stopped while gate P4 causes the loading of register R2 with the contents of the cell of memory M1 addressed by counter CN4. Thereafter, transceiver RT generates the preamble of the subsequent frame and resumes the generation of the pulse sequence TRABIT for the transmission of the bytes of that frame as described with reference to FIG. 9.

When comparators CP3 and CP4 detect the reading of the last frame stored in memory BT, signal FINTX is emitted to reset counter CN4 and to deactivate unit TB while generating the signal FINTX1 giving rise to signal FINCOR. The latter signal advises component VPP of the successful transmission of the entire outgoing sequence over bus BB and also resets the counter NCOL (FIG. 7b) as well as the flip-flop FS4 (FIG. 7c) of logic unit GA, thereby making memory BT again available for loading by frames sent out from component VPP. With counters CN3 and CN4 reset, another writing cycle can be initiated. Signal FINCOR also transfers the contents of register R2 to register R3 (FIG. 4) as an indication of the last cell of memory BT that has been read; this cell address should correspond to that generated by counter CN2.

If transmission has been aborted because of a collision giving rise to signal COLDET on lead 210, flip-flop FS7 and counter CN8 of unit TB (FIG. 9) are immediately reset whereby this unit can no longer respond to signal TRABIT from transceiver RT. Upon expiration of interval T0, time base TT (FIG. 3) starts to measure the interval T1 whereupon unit GA can again explore the possibility of access, on the basis of updated probability parameters, as described with reference to FIG. 7b.

Collision signal COLDET also causes the transfer of the contents of register R3 to counter CN2 by means of signal LDO on lead a8.

If unit GA decides to attempt another access, signal RITFRM is emitted by network L3 (FIG. 8) with the same effect as the externally generated signal TRAFRM. When the permitted number of retries is reached, with energization of output lead b1 of counter NCOL, network L3 emits the congestion signal COCATX which has the same effect as signal COLDET on controller CBT (FIG. 4). As already noted, this state of congestion can be canceled only by a new signal TRAFRM by component VPP.

If, upon the appearance of signal TRAFRM or RITFRM, unit GA decides not to attempt an access, the transmission is rescheduled at the end of interval T1 and the probability parameter q is suitably updated.

Figure 10:
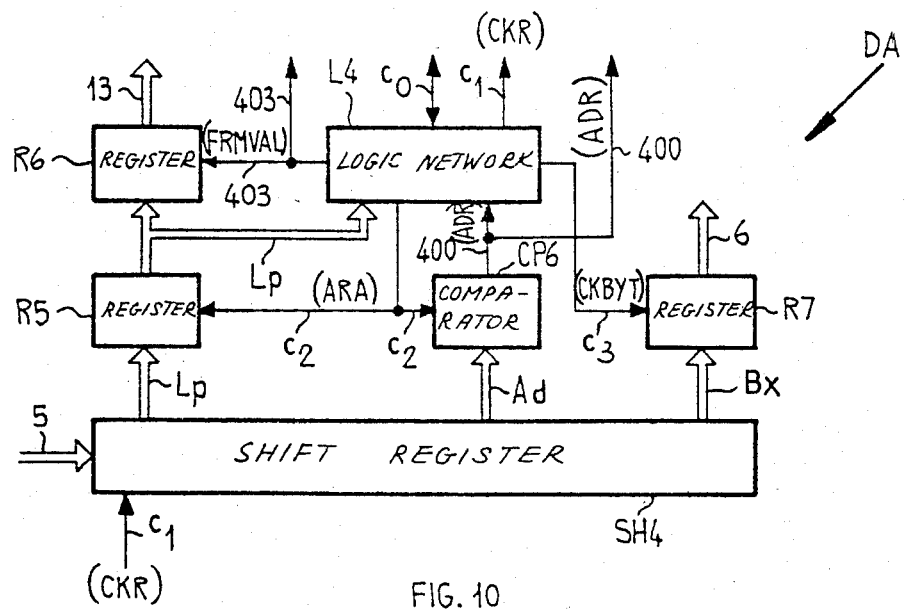
FIG. 10 shows details of a logic unit forming part of a receiving section of the component of FIG. 3.

FIG. 10 shows details of logic unit DA which comprises a series-in/parallel-out shift register SH3 with an input connected to line 5 for loading the bits present thereon upon command of a timing signal CKR, supplied by a logic network L4 which generates that signal in the way hereinafter described.

Register SH4 must have a length allowing it to contain, besides an information word, the words which code the frame length Lp and the destination address Ad of the frame. Register SH4 can therefore be considered as subdivided into three groups of stages in which the above words are respectively present in suitable loading phases.

The outputs of the first group of stages are connected to a parallel-in, parallel-out register R5, which keeps word Lp available for logic network L4 and for a register R6 which is loaded with value Lp and makes it available to component VPP (FIG. 2). Registers R5, R6 are enabled by network L4 through two signals ARA, FRMVAL discussed below.

The outputs of the second group of stages are connected to a group of inputs of a comparator CP6 which, when enabled by signal ARA, compares the address supplied by register SH4 with the address of station ST1 wired or stored inside the comparator; the result of the comparison is sent to network L4 and controller CBR via line 4 to preset the memory for reading, if necessary.

The outputs of the third group of stages of register SH4 are connected to an input register R7 for memory BR whose output is the connection 6. Register R7 presents the data to this memory upon command of a signal CKBYT supplied by network L4. FIG. 10 shows only the inputs and outputs of that network connected to the other blocks of unit DA. The other inputs and outputs are collectively represented by an arrow $c_0$ and will be examined in detail and reference to FIG. 11.

As shown there, a multiplexer MX3 receives at its two inputs respective timing signals, both at a frequency equal to the bit rate of bus BB, and switches either of them to its output $c_1$ as the signal CKR controlling the shift in register SH4.

The first of these signals, RICBIT, is sent from transceiver RT through a wire 240 and is associated with the data present in the bus; the second signal RCK is the fundamental clock of the transceiver.

Multiplexer MX3 is switchable by means of a set/reset flip-flop FS9 which receives at its setting input a signal SYNFRM, coming from transceiver RT through a wire 241 and indicating a frame beginning; flip-flop FS9 receives at its resetting input, through an OR gate P36, a signal LPRIC indicating that Lp words have been loaded or a signal FRMINV indicating a non-valid frame, said latter signal being generated by a circuit VCR checking the reception correctness.

More particularly, multiplexer MX3 transmits the signal RCK when flip-flop FS9 is set, i.e. prior to the arrival of a signal SYNFRM and after the activation of the gate P36, and transmits the signal RICBIT when it is set, i.e. between the arrival of a signal SYNFRM and the activation of gate P36.

The output of multiplexer MX3 is also connected to the clock input of a counter CN9 which can count up to a value equal to the number of bits coding all of address Ad and frame length Lp. Counter CN9 is enabled by signal SYNFRM and is reset by the output signal of gate P36; both these signals are sent to it through flip-flop FS9.

The carry-out port of counter CN9 is connected to the set input of a set/reset flip-flop FS10, whose output Q is connected to a wire $c_2$ on which the enable signal ARA for register R5 and comparator CP6 (FIG. 10) is present. Flip-flop FS10 is reset either by signal FRMINV or by a valid-frame signal FRMVAL generated as described hereinafter; these signals are passed by an OR gate P37.

Wire $c_2$ is also connected to the enabling input of a counter CN10 which counts up to a number equal to the number of bits of the information words in the frame, i.e. to the number of stages in the third group of register SH4. Counter CN10 receives at the clock input signal CKR and its carry-out port is connected to an input of an AND gate P38 and to the clock input of two counters CN11, CN12. A second input of gate P38 is connected to an output lead 400 of comparator CP6 which, when a frame is addressed to station ST1, enables gate P38 to pass the carry-out signal of counter CN10 to a lead $c_3$ as a signal CKBYT enabling register R7 (FIG. 10). Signal CKBYT is also stored into a D-type flip-flop FD5, upon command of signal CKR, and sent to controller CBR (FIG. 3) through a wire 401 as a signal BYTCON confirming the completion of a word.

Counter CN11, receiving at its clock input the carry-out signal of counter CN10, counts the number of words loaded in unit DA starting from a value different from 0 (e.g. from 2) in order to take into account the loading of codes Lp and Ad. Counter CN11 feeds an input of a comparator CP7 which has a second input connected to the output of register R5 wherefrom it receives the value Lp. Comparator CP7 has therefore the task of detecting that all Lp words of a frame have been loaded. The output lead $c_5$ of comparator CP7, on which the signal LPRIC is present, is connected to an input of shift register SH5, to the enable input of counter CN12, to an input of a verification circuit VCR and to OR gate P36.

Register SH5 performs as a delay element and is to send signal LPRIC to circuit VCR after the time needed by the activity sensor of transceiver RT to detect the absence of carrier on bus BB, with emission of a signal OFFCAR via a wire 242.

Counter CN12 is designed to allow the check of the loading in memory BR of the words still present in register SH4 after signal RICBIT has disappeared. For this purpose its carry-out port is connected to the input of an AND gate P39 which has a second input connected to an output $c_4$ of circuit VCR that is active when signal OFFCAR has arrived within the time set by register SH5.

The output signal FRMVAL of gate P39, present on a wire 403, indicates the correct transfer of a frame to memory BR (FIG. 3).

Circuit VCR, receiving signals LPRIC and OFFCAR, the output signal of register SH5 and a signal JAMDET emitted by transceiver RT through a wire 24 to indicate collisions, serves to check that signal OFFCAR arrives in a predetermined time after the loading of Lp words in register SH4 (FIG. 10).

In the affirmative, a signal is emitted on an output lead $c_4$ which, through gate P39, indicates the frame validity. In all other cases (upon signal OFFCAR preceding signal LPRIC or arriving after the output signal of register SH5, or upon arrival of signal JAMDET), signal FRMINV is emitted on wire 402 to signal the irregularity to controller CBR (FIG. 3).

Signals FRMVAL and FRMINV are also sent, as already mentioned, to gate P37 whose output signal resets all the circuits (counters etc.) that are off-normal.

Figure 12:
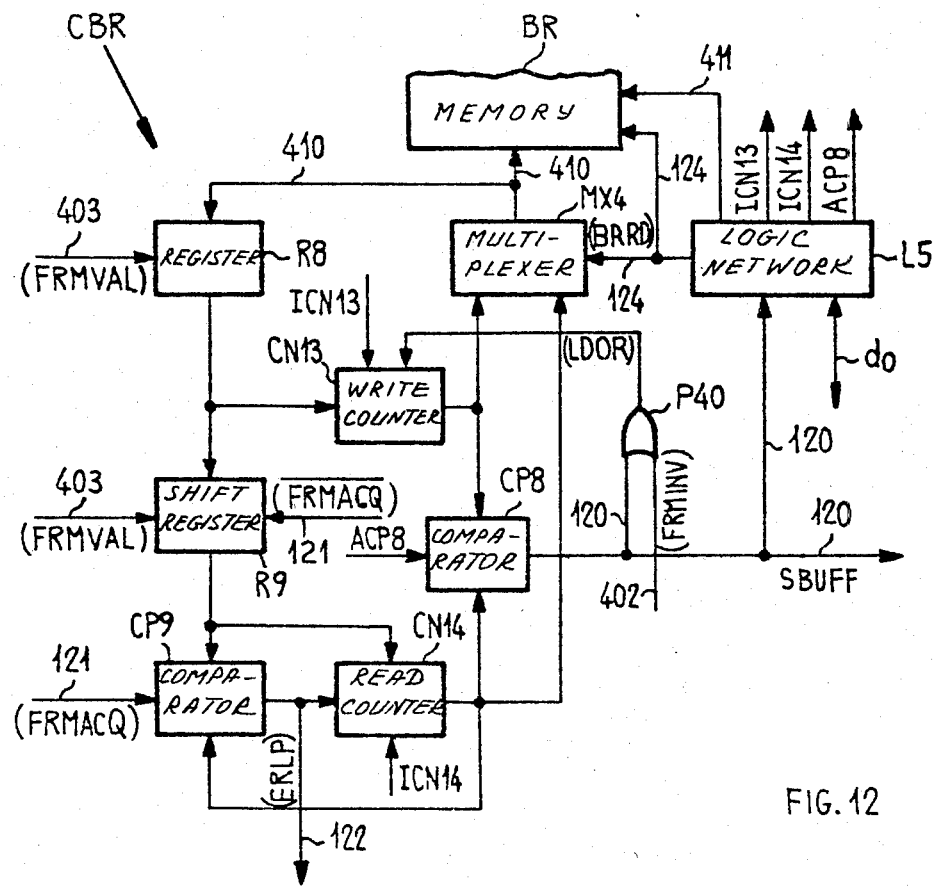
FIG. 12 shows details of a control unit included in the receiving section of the component of FIG. 3.

In FIG. 12, memory BR is seen to receive the read and write addresses from two counters CN13, CN14 through a multiplexeer MX4. The latter usually transfers to its output 410 the read addresses and is switched by a command BRRD supplied via a wire 124 by a logic network L5 as a consequence of the emission of a signal ADR by comparator CP6 (FIG. 10); the same signal enables memory BR for reading. Network L5 further supplies, as will be described hereinafter, the read/write command for memory BR and signals ICN13, ICN14 for advancing counters CN13, CN14.

The outputs of these counters are also connected to a comparator CP8, having the same functions as comparator CP1 (FIG. 4) of comparing the two addresses present at its inputs when enabled by a signal ACP8 coming from network L5.

A positive outcome of the comparison yields a signal SBUFF which is sent to component VPP (FIG. 2) via a wire 120, to network L5, in order to switch multiplexer MX4 to its reading position when the memory is full, and to an OR gate P40 which receives from unit DA via wire 402 the signal FRMINV. The output signal LDOR of gate P40 is sent to controller CN13 to let it load and transfer to multiplexer MX4 the contents of a register R8 which, upon command of signal FRMVAL, stores the address of the first memory cell available for writing, present at that instant at the output of this multiplexer. In this way the memory BR does not store unwanted frame fragments, originated by collisions or by the exhaustion of its capacity during reception.

The outputs of read-address counter CN14 is also connected to an input of a comparator CP9 which has a second input connected to the output of a bank of shift registers R9 of the FIFO type which, upon command of signal FRMVAL, store the same address that is loaded in register R8. The comparison between the two addresses present at the inputs of device CP9 is controlled by a signal FRMACQ emitted by component VPP (FIG. 2) on a wire 121 to indicate that a frame has been read.

The result of such a comparision indicates whether the frame has been correctly received by component VPP. The trailing edge of signal FRMACQ serves to control the shift in register R9. A signal ERLP is present on an output 122 of comparator CP9, in case of a discrepancy between the addresses, to indicate the incorrect reception of a frame to component VPP; the same signal is sent to counter CN14 to let it load and hence transfer to multiplexer MX4 the address present at the output of register R9. In this way the reading can be resumed at the next frame.

Figure 13:
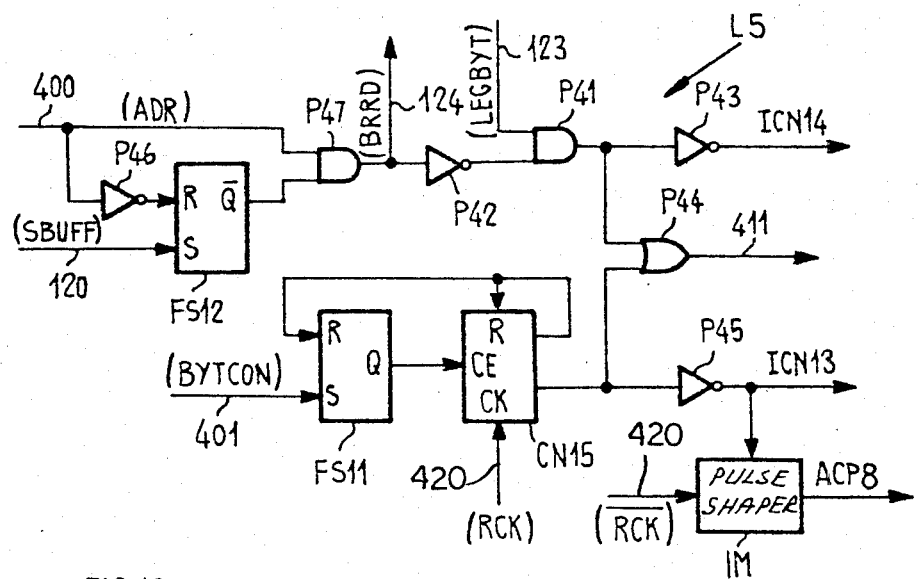
FIG. 13 shows particulars of a logic network included in the control unit of FIG. 12.

Network L5, as shown in FIG. 13, comprises an AND gate P47 receiving at a first input the signal ADR and at a second input the signal present at the set output Q of a set/reset flip-flop FS12 which stores signal SBUFF present on wire 120 and is reset by the trailing edge of signal ADR through an inverter P46.

The signal present at an output lead 124 of gate P47 is the signal BRRD, which, when of logical value "1", indicates that writing in memory BR can occur. This will be the case if signal ADR is present and signal SBUFF is absent; signal BRRD passes to 0 when signal ADR passes to 0 or upon the occurrence of signal SBUFF. The availability of memory BR for writing or reading is signaled also to component VPP.

Signal BRRD is sent through an inverter P42 also to the input of an AND gate P41 which receives at a second input, through a wire 123, a signal LEGBYT emitted by component VPP to request the reading of a word. This signal is presented at the output of gate P41 as a read command for memory BR, to which it is sent through an OR gate P44 and a wire 411; the same signal, negated by an inverter P43, is the signal ICN14 advancing the counter CN14 (FIG. 12) which is therefore stepped by the trailing edge of signal LEGBYT.

OR gate P44 receives at a second input the write command for memory BR, present at an output of a counter CN15, clocked by signal RCK or by a submultiple thereof (e.g. at half-frequency) and enabled by a set/reset flip-flop FS11 which stores signal BYTCON supplied by unit DA. The same write command, negated by an inverter P45, is the signal ICN13 advancing counter CN13 (FIG. 12). The stage output energized on a further step of counter CN15 is connected to the resetting inputs of the same counter and of flip-flop FS11.

The signal issuing from inverter P45 is also sent to a pulse-shaping circuit IM which, with a certain delay with respect to signal ICN13, generates a signal ACP8 enabling the comparator CP8 (FIG. 12).

We shall now describe the operation of the receiving section RX in greater detail.

WRITING

A frame transmitted via bus BB appears at the access ports of the various stations and is transferred through tranceiver RT (FIG. 2) to decoder DA (FIG. 3). This loads the frame header and, after arrival of the number of bits used in the network to code the frame length Lp and the address Ad of destination, enables register R5 (FIG. 10) and comparator CP6. If the frame is addressed to multiplexer station ST1, the writing in memory BR (FIG. 12) is enabled and multiplexer MX4 connects writing-address counter CN13 to output 410.

After the counting of the bits necessary for the first information word to be present at the inputs of register R7 (FIG. 10), there is emitted the signal CKBYT, enabling register R7 to load this word, and signal BYTCOR from which network L5 (FIG. 12) obtains the write command for memory BR, followed by signals ICN13 incrementing counter CN13 and signal ACP8 enabling CP8. Supposing, as for section TX (FIG. 3), that the incoming message considered is the first designed for that station, comparator CP8 (FIG. 12) will signal a discrepancy of the addresses present at its inputs, and the write operation can continue as described until all the Lp words of the frame have been loaded into unit DA.

When all Lp words have been transferred to memory BR, signal FRMVAL is emitted and enables register R6 (FIG. 10) to report the frame length to component VPP along with the information that a frame has been stored.

At the same time, registers R8, R9 (FIG. 12) load the address for storage in memory BR (FIG. 3) of the first word of the subsequent frame.

The operations are repeated unchanged until the reception is complete or the memory is full.

In the first case the reading is started, as will be described hereinafter.

In the second case, comparator CP8 sends to component VPP (FIG. 2) the signal SBUFF which indicates that the address where a new word is to be written is equal to the address of the first word to be read. The same signal causes counter CN13 (FIG. 12) to load the address stored in register R8 so that writing will be resumed from that address, and enables the reading in the memory as described in connection with FIG. 13.

As a consequence, the frame which has exhausted the capacity of the memory is lost.

Figure 11:
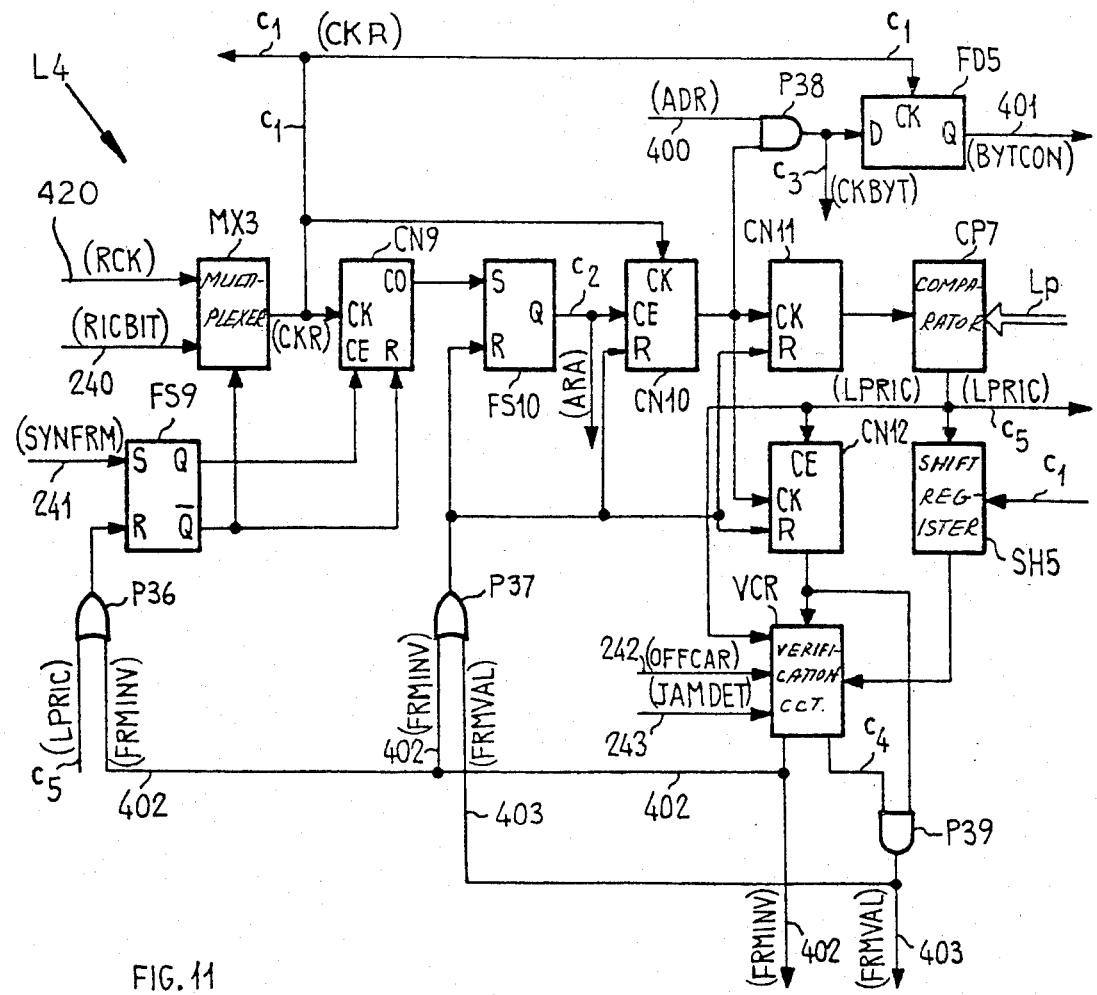
FIG. 11 shows particulars of a logic network included in the unit of FIG. 10.

If during the loading some irregularity takes place, as described in connection with FIG. 11, the generation of signal FRMINV has the the same effects as signal SBUFF in controller CBR.

READING

When writing has been completed, or when the memory is full, component VPP starts the reading by sending signal LEGBYT to network L5 (FIG. 12).

If signal BRRD is 0 (memory enabled to reading), network L5 derives from signal LEGBYT the read command and subsequently, once the reading has been completed, the signal ICN14 advancing the counter CN14. The word addressed by this counter (e.g. the first word in memory BR) is then transferred to component VPP (FIG. 2) through connection 1b. Signal LEGBYT is emitted from component VPP for each word to be read in the memory: once the signal LEGBYT has been sent Lp times, controller CBR (FIG. 12) is supplied with signal FRMACQ which enables device CP9 to compare the frame-end address, stored in register R9 during the writing, and the current address generated by counter CN14. If the two addresses coincide, Lp words have been actually read and thus the value Lp has been correctly decoded; then, in response to the trailing edge of signal FRMACQ, the address read in register R9 is canceled and that of the next frame is sent to comparator CP9.

If the two addresses do not coincide, this means that Lp has been incorrectly decoded and the reading is resumed from the first word of the subsequent frame, as the contents of register R9 are loaded into another CP14. The irregular frame cannot be recovered at this level, as the data concerning Lp are no longer available. This is of slight importance as the higher protocol levels generally may ask retransmission of the missing frame.

The emission of signal LEGBYT might take place at the same time as a request for writing into the memory. In this case, however, the write request is neglected so that the information being read does not become lost and is handled as soon as the word has been read.

Figure 14A:
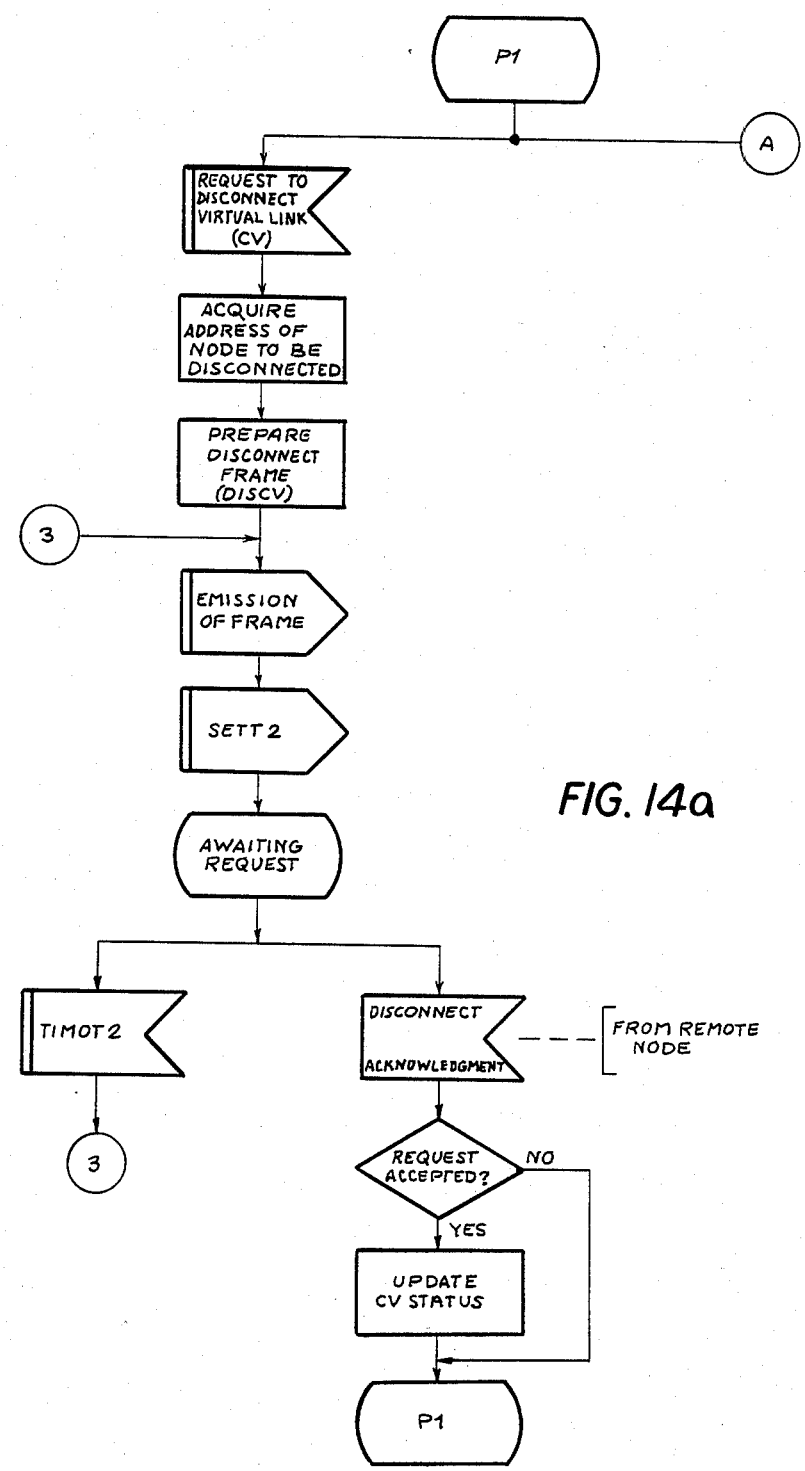
FIGS. 14a, 14b, 14c and 15-19 are flow charts relating to the operation of the upper-tier portion of the interface.
Figure 14B:
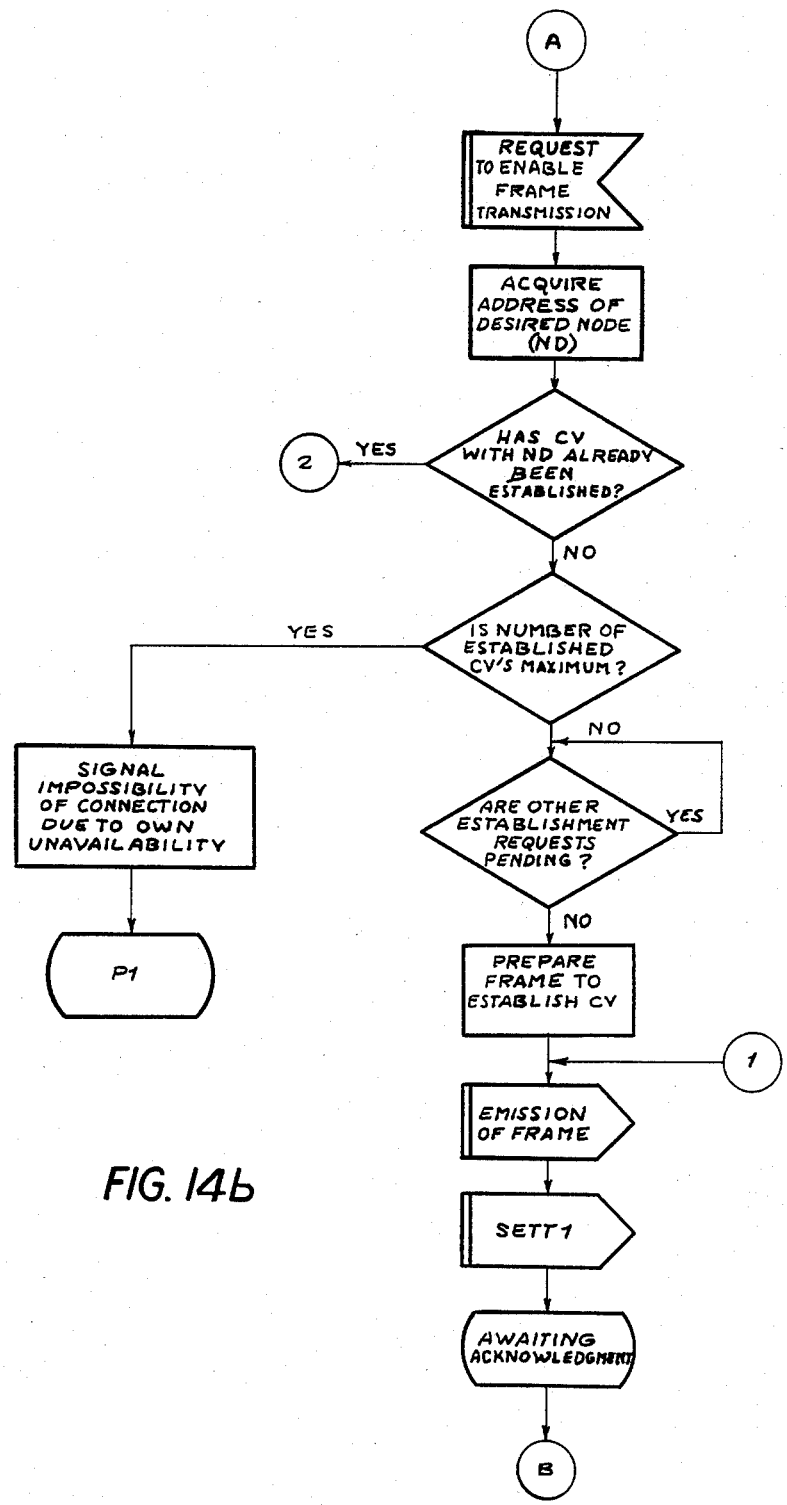
Figure 14C:
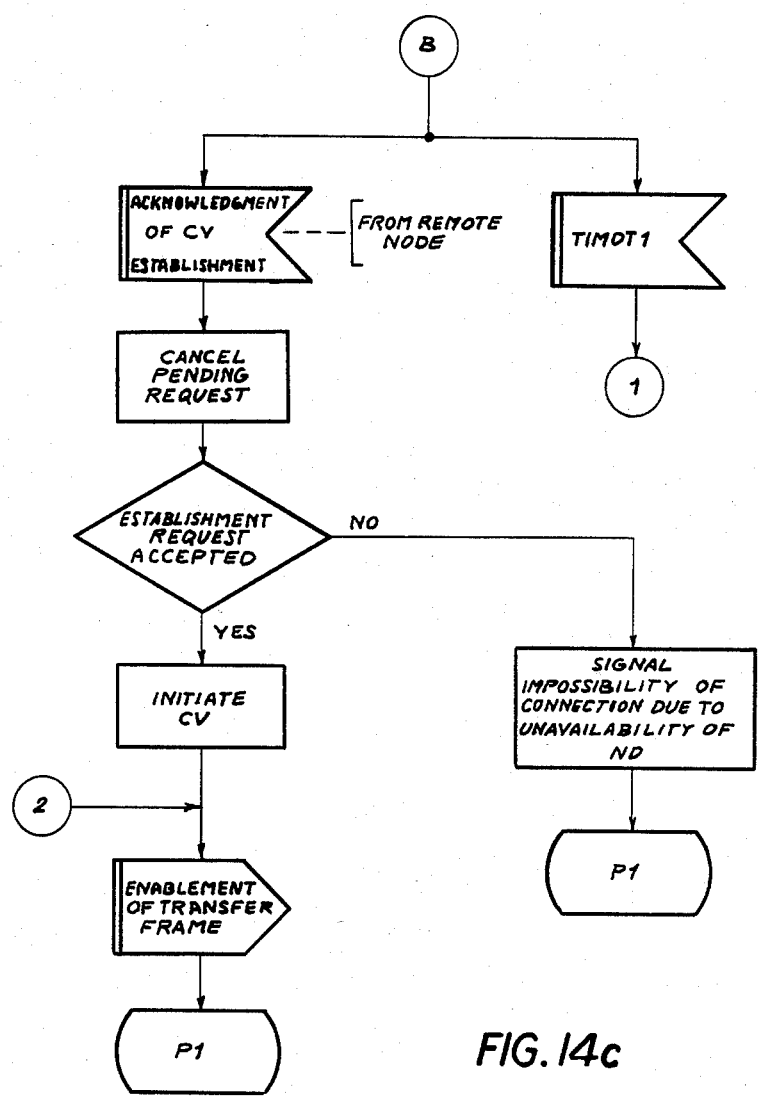
Figure 15:
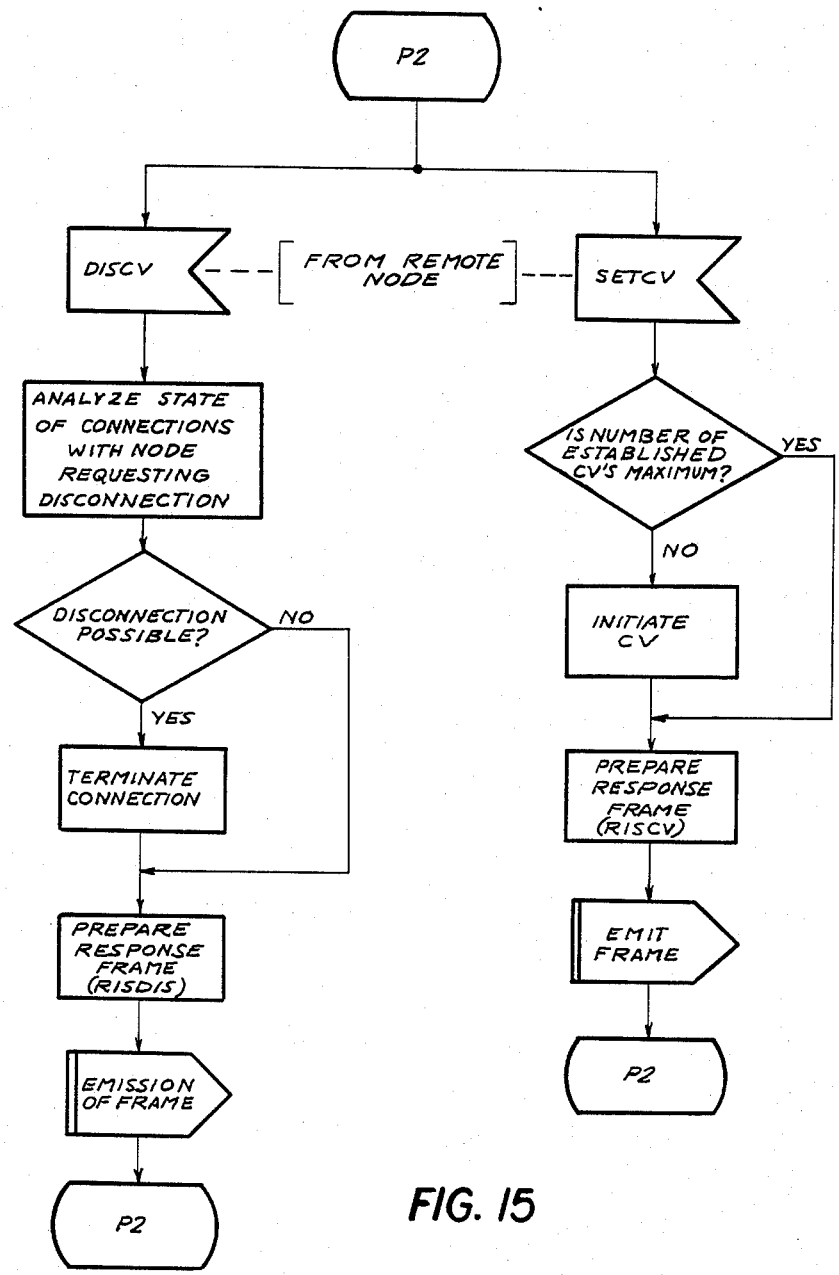
Figure 16:
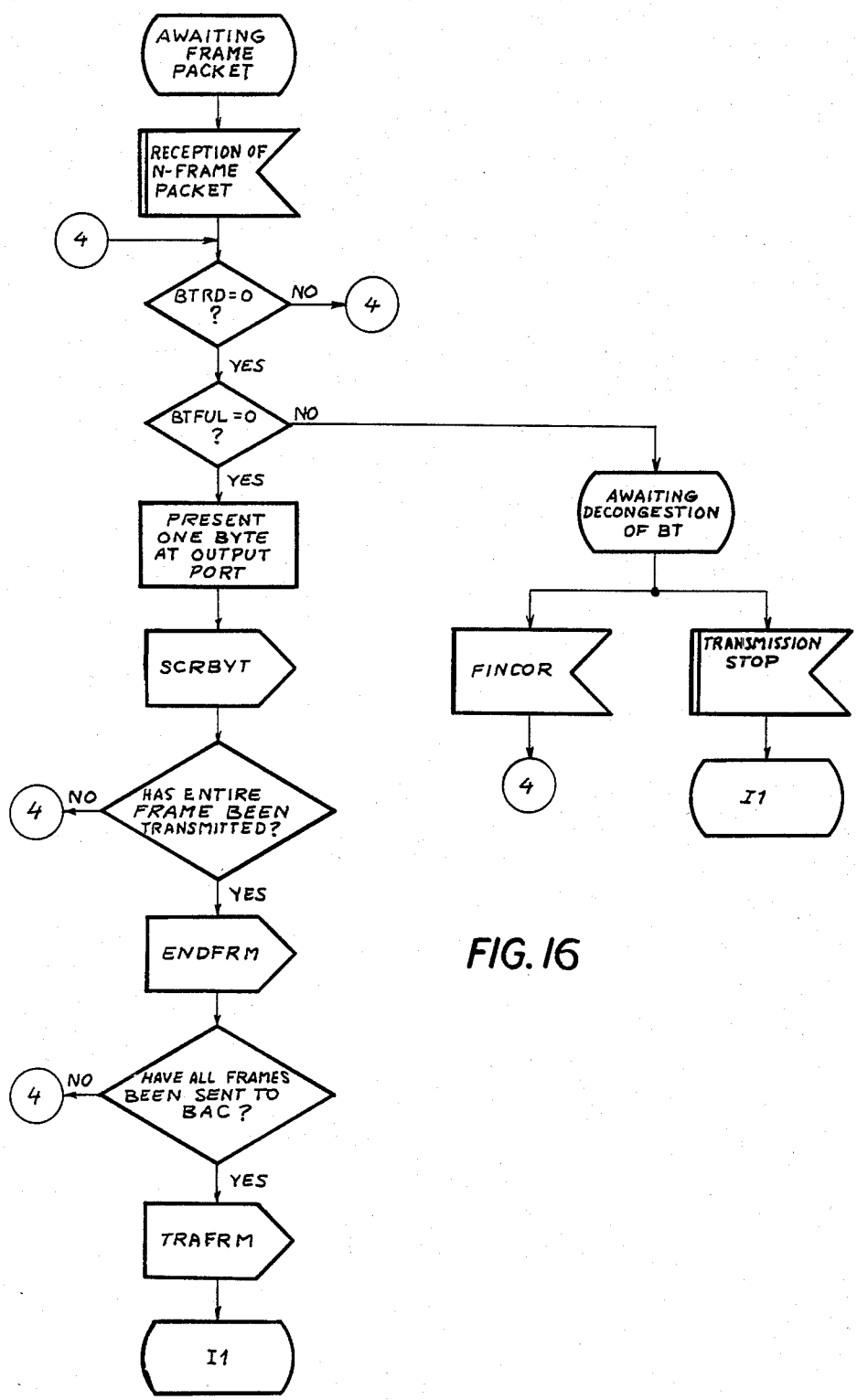
Figure 17:
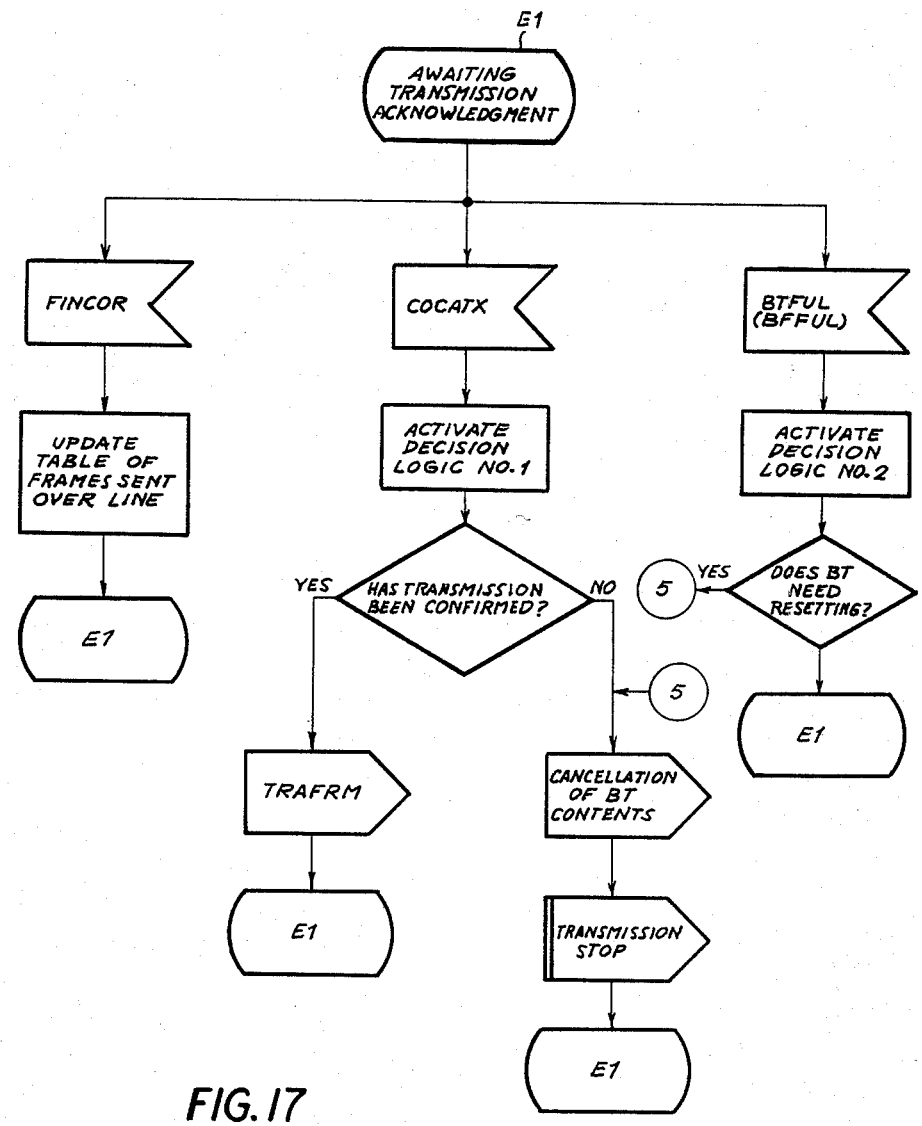
Figure 18:
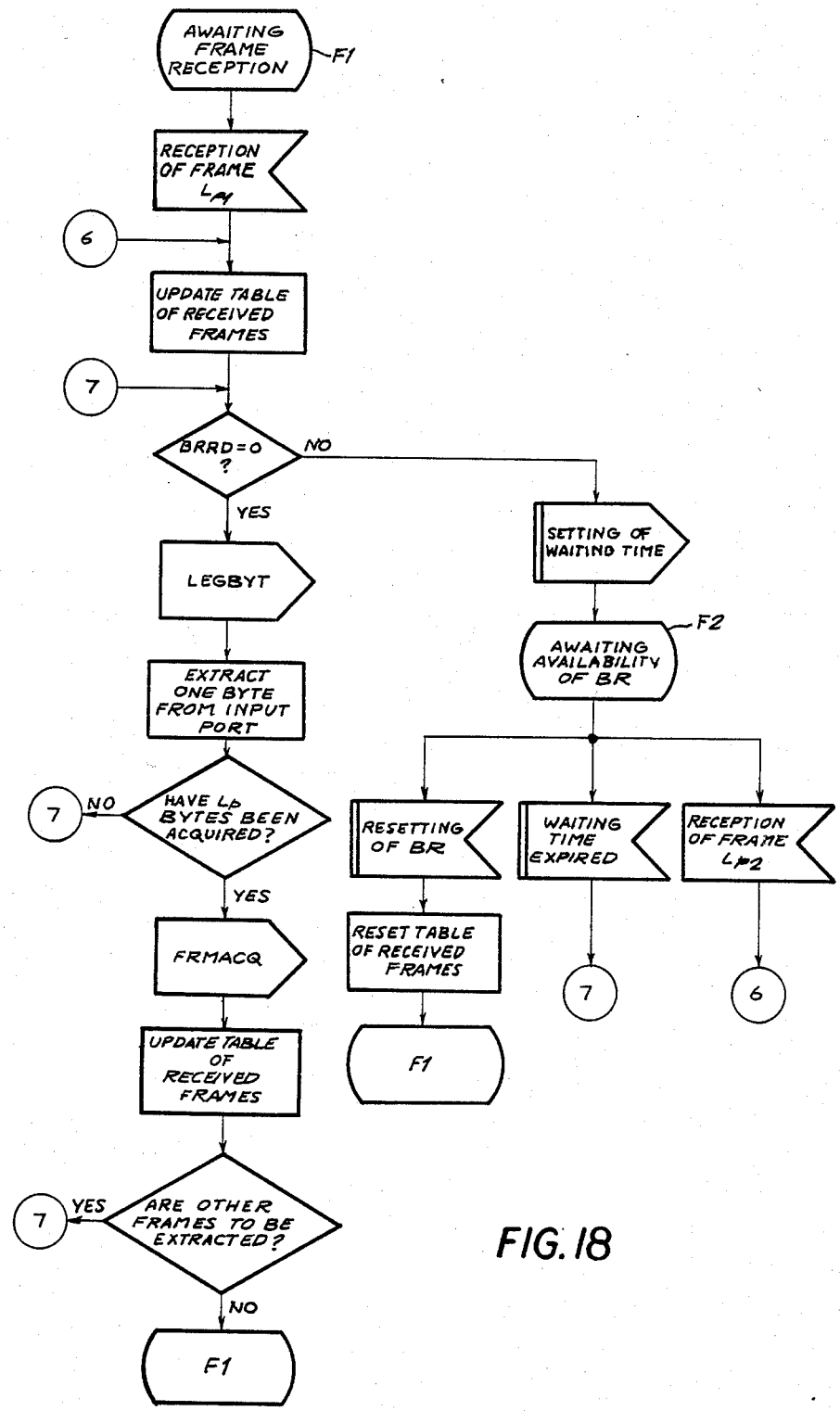
Figure 19:
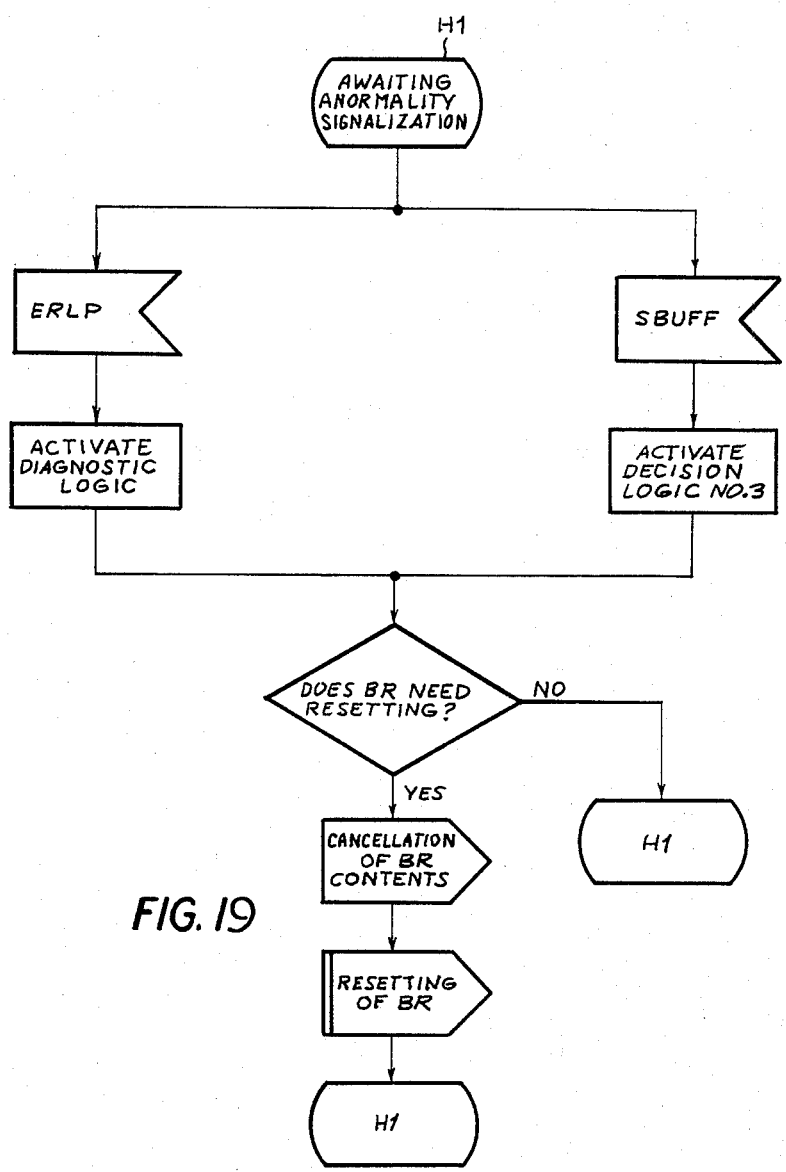

The operations of component VPP, under the control of its microprocessor, are represented by the flow diagrams of FIGS. 14a–14c and 15–19. FIGS. 14a–14c relate to the case in which requests for setting up virtual links CV are handled one at a time so that checks on waiting requests are needed; a request is no longer considered pending when the station of its destination has given an acknowledgment. FIGS. 16–19 take into account the possibility of canceling the contents of the buffer memories and repeating anew the entire operation in case of series anomalies, e.g. when a station cannot access the bus after a congestion or cannot resolve the problem of memory unavailability.

For the manner of organizing the information from the subscriber or user terminals into frames or extracting that information therefrom, reference can be made to the article by H. H. Folts identified above.

Component VPP will have the task of numbering the virtual links CV and insert the corresponding information into the frame headers; the remaining information is supplied by level DLC. The frame length Lp will be calculated so as to take any redundancy codes, even those subsequently inserted by component BAC, into account.

We claim:

1. In a telecommunication system with a plurality of stations served by a common transmission channel for the selective exchange of digitized messages subsequently inserted by component BAC, into account.

the improvement wherein said processing means of a given station comprises an interface with a lower-tier portion and an upper-tier portion in hierarchical relationship interposed between said transceiver means and a higher-level structure controlling the organization of outgoing messages into data frames headed by destination codes as well as the forwarding to a user of incoming messages destined for the given station; said lower-tier portion including wired-logic circuit for controlling said transceiver means and temporarily storing outgoing and incoming messages, said upper-tier portion including microprogrammed circuitry for exchanging information with said higher-level structure and with said lower-tier portion to establish, maintain and terminate virtual point-to-point data links between the given station and any other of said stations, said lower-tier portion comprising a transmitting section and a receiving section, said transmitting section including a first buffer memory for the temporary storage of outgoing data frames, said receiving section including a second buffer memory for the temporary storage of incoming data frames; said transmitting section further including a first controller responsive to writing instructions from said upper-tier portion for loading outgoing sequences of data words organized in a variable number of frames into said first buffer memory and, in response to an end-of-message signal from said upper-tier portion, transferring the contents of said first buffer memory to said transceiver means for delivery to said channel during an idle period thereof; said receiving section further including a second controller responsive to the arrival of an incoming sequence of data words, addressed to the given station, for writing same in said second buffer memory and, upon completed reception of the incoming sequence, transferring same from said second buffer memory to said upper-tier portion in response to a reading instruction therefrom, said first controller being provided with first load-limiting means responsive to exhaustion of the storage capacity of said first buffer memory for signaling said upper-tier portion to block the writing of additional data words in said first buffer memory and initiating a readout of the contents thereof to said transceiver means; said second controller being provided with second load-limiting means responsive to exhaustion of the storage capacity of said second buffer memory for signaling said upper-tier portion to block the writing of additional data words therein prior to a readout of the contents of said second buffer memory to said upper-tier portion.

2. An interface as defined in claim 1 wherein said first buffer memory is provided with a first writing-address counter, a first reading-address counter and first multiplexer means for alternatively connecting said first counters to an address input of said first buffer memory, said first controller further including first logic means generating switching commands for said first multiplexer means and stepping commands for said first counters, said first load-limiting means comprising a first comparator with inputs connected to said first counters for signaling the exhaustion of the storage capacity of said first buffer memory upon detecting an equality in the addresses emitted by said first counters; said second buffer memory being provided with a second writing-address counter, a second reading-address counter and second multiplexer means for alternatively connecting said second counters to an address input of said second buffer memory, said second controller further including second logic means generating switching commands for said second multiplexer means and stepping commands for said second counters, said second load-limiting means comprising a second comparator with inputs connected to said second counters for signaling the exhaustion of the storage capacity of said second buffer memory upon detecting an equality in the addresses emitted by said second counters.

3. An interface as defined in claim 2 wherein said first controller further includes an additional memory provided with an additional writing-address counter, an additional reading-address counter and additional multiplexer means for alternatively connecting said additional counters to an address input of said additional memory under the control of said first logic means, a cell of said additional memory identified by said additional writing-address counter being loadable in response to a frame-end signal from said upper-tier portion with the address last emitted by said first writing-address counter, said first controller being further provided with an additional comparator with inputs connected to said first reading-address counter and to an output register of said additional memory for signaling the completed readout of an outgoing frame, during transfer of the contents of said first buffer memory to said transceiver means, in response to an equality of an address emitted by said first reading-address counter and an address read out from said additional memory into said output register, said additional reading-address counter being steppable by said additional comparator upon the completed readout of an outgoing frame.

4. An interface as defined in claim 3 wherein said first logic means is responsive to a congestion signal from said first load-limiting means for transferring the contents of said output register to said first reading-address counter upon a blocking of the writing of additional data words in said first buffer memory.

5. An interface as defined in claim 4 wherein said first logic means is also responsive to a collision signal from said transceiver means, aborting a delivery of the contents of said first buffer memory to said channel, for transferring the contents of said output register to said first reading-address counter.

6. An interface as defined in claim 3 wherein said additional writing-address counter has an output signal to said upper-tier portion an exhaustion of the storage capacity of said additional memory to block the writing of additional data words in said first buffer memory.

7. An interface as defined in claim 1 wherein said transmitting section further comprises storage means loadable with individual data words read out from said first buffer memory and transfer means responsive to a pulse sequence from said transceiver means for sequentially emitting the bits of each stored data word to said channel.

8. An interface as defined in claim 7 wherein said transmitting section further includes arithmetic means responsive to a start signal from said upper-tier portion to explore the probability of successful accession of said channel during an idle period for the readout of an outgoing message stored in said first buffer means, and logic means for signaling to said transceiver means a decision to access said channel under the control of said arithmetic means.

9. An interface as defined in claim 8 wherein said transmitting section further includes timing means for measuring an inactivity-confirming interval upon an attempted access to said channel, and inhibiting means coupled to said logic means for aborting the transfer of data words from said first buffer memory to said transceiver means upon detection of activity on said channel during said interval.

10. An interface as defined in claim 9 wherein said logic means includes updating means for modifying the operation of said arithmetic means and attempting another access to said channel upon expiration of a waiting period measured by said timing means.

11. An interface as defined in claim 10 wherein said logic means further includes counting means for limiting the number of access attempts.

12. An interface as defined in claim 1, further comprising error-connecting means interposed between said transceiving means and said transmitting and receiving sections of said lower-tier portion.

13. In a telecommunication system with a plurality of stations served by a common transmission channel for the selective exchange of digitized messages between any two of said stations, each of said stations being provided with an access port, transceiver means for sending outgoing messages to said channel and extracting incoming messages from said channel by way of said access port, said transceiver means being capable of sensing the activity of said channel to detect idle periods when no messages are being sent thereover, and respective processing means at each station connected to said transceiver means thereof for handling outgoing and incoming messages, the improvement wherein said processing means of a given station comprises an interface with a lower-tier portion and an upper-tier portion in hierarchical relationship interposed between said transceiver means and a higher-level structure controlling the organization of outgoing messages into data frames headed by destination codes as well as the forwarding to a user of incoming messages destined for the given station; said lower-tier portion including wired-logic circuitry for controlling said transceiver means and temporarily storing outgoing and incoming messages, said upper-tier portion including microprogrammed circuitry for exchanging information with said higher-level structure and with said lower-tier portion to establish, maintain and terminate virtual point-to-point data links between the given station and any other of said stations, said lower-tier portion comprising a transmitting section and a receiving section, said transmitting section including a first buffer memory for the temporary storage of outgoing data frames, said receiving section including a second buffer memory for the temporary storage of incoming data frames; said transmitting section further including a first controller responsive to writing instructions from said upper-tier portion for loading outgoing sequences of data words organized in a variable number of frames into said first buffer memory and, in response to an end-of-message signal from said upper-tier portion, transceiver means for delivery to said channel during an idle period thereof; said receiving section further including a second controller responsive to the arrival of an incoming sequence of data words, addressed to the given station, for writing same in said second buffer memory and, upon completed reception of the incoming sequence, transferring same from said second buffer memory for said upper-tier portion in response to a reading instruction therefrom, said receiving section further including shift-register means for temporarily retaining an incoming data frame, address-comparing means connected to certain stage outputs of said shift-register means to determine the destination of a data frame retained therein, and check means connected to other stage outputs of said shift-register means for verifying the complete reception of said data frame.

* * * * *